US012615101B2

(12) United States Patent (10) Patent No.: US 12,615,101 B2
Ruan et al. (45) Date of Patent: Apr. 28, 2026

(54) COMMUNICATION METHOD FOR WIRELESS FIDELITY WI-FI SYSTEM AND APPARATUS

(71) Applicant: HUAWEI TECHNOLOGIES CO., LTD., Shenzhen (CN)

(72) Inventors: Wei Ruan, Shanghai (CN); Wei Lin, Shenzhen (CN); Tingwu Wang, Shenzhen (CN); Xuqiang Shen, Shenzhen (CN); Qian Wang, Shanghai (CN); Muhu Li, Changsha (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 424 days.

(21) Appl. No.: 18/300,506

(22) Filed: Apr. 14, 2023

(65) Prior Publication Data

US 2023/0254061 A1 Aug. 10, 2023

Related U.S. Application Data

(63) Continuation of application No. PCT/CN2020/121687, filed on Oct. 16, 2020.

(51) Int. Cl.
*H04L 1/00* (2006.01)
*H04L 27/26* (2006.01)
*H04W 84/12* (2009.01)

(52) U.S. Cl.
CPC ........ *H04L 1/0003* (2013.01); *H04L 27/2602* (2013.01); *H04W 84/12* (2013.01)

(58) Field of Classification Search
CPC .................................................... H04L 1/0003
See application file for complete search history.

(56) References Cited

U.S. PATENT DOCUMENTS 9,497,057 B2 * 11/2016 You ..................... H04L 25/0226
10,034,288 B2 * 7/2018 Chun .................... H04W 52/58
(Continued)

FOREIGN PATENT DOCUMENTS

EP 3934140 A1 1/2022
WO 2020187208 A1 9/2020

OTHER PUBLICATIONS

LAN/MAN Standards Committee of the IEEE Computer Society;"P802. 11 ay(TM)/D4.1 Draft Standard for Information Technology-Telecommunications and Information Exchange Between Systems-Local and Metropolitan Area Networks-Specific Requirements-Part 11:Wireless LAN Medium Access Control (MAC) and Physical Layer (PHY) Specifications",IEEE Draft Draft P802.11AY D4.1 IEEE-SA Piscataway NJ USA vol. 802.11 ay drafts, No. 04.1 Aug. 19, 2019 (Aug. 19, 2019),XP068154561, pp. 1-792.
(Continued)

*Primary Examiner* — Jason E Mattis

(57) ABSTRACT

In the field of communication technologies, a communication method for a wireless fidelity (Wi-Fi) system and an apparatus provide improved performance of demodulating a Wi-Fi frame by the apparatus. The communication method for the wireless fidelity (Wi-Fi) system includes: generating a Wi-Fi frame including a first preamble field, where the first preamble field indicates a modulation and coding scheme MCS of at least one symbol in a data field in the Wi-Fi frame, an MCS order of first m symbols in the at least one symbol is less than an MCS order of another symbol, and m is a positive integer greater than or equal to 1; and transmitting the Wi-Fi frame.

20 Claims, 16 Drawing Sheets

(56) References Cited

U.S. PATENT DOCUMENTS

| | | | | |
|---|---|---|---|---|
| 10,651,967 | B1 * | 5/2020 | Zavurov | H04L 27/0008 |
| 2016/0330300 | A1 * | 11/2016 | Josiam | H04B 7/0452 |
| 2018/0199272 | A1 * | 7/2018 | Chu | H04L 1/0083 |
| 2019/0123849 | A1 | 4/2019 | Baldemair et al. | |
| 2019/0199469 | A1 | 6/2019 | Lin | |
| 2020/0213933 | A1 * | 7/2020 | Patil | H04W 28/0263 |
| 2021/0391941 | A1 * | 12/2021 | Inohiza | H04L 27/2602 |
| 2022/0345550 | A1 * | 10/2022 | Josiam | H04L 65/40 |

OTHER PUBLICATIONS

3GPP TSG-RAN WG4 82 Bis, R4-1702802,"Discussion on NR time/frequency tracking accuracy requirement Discussion",Samsung,Spokane,Washington, USA, Apr. 3-7, 2017,XP051255883, total 3 pages.
Extended European Search Report dated Oct. 6, 2023, issued for European Application No. 20957282.5 (12 pages).
Arooba Zeshan et al."VLC with 802.11ac Frame Structure", doc.:11-20-0196-00-bb,Jan. 15, 2020,total 9 pages.
Osama Aboul-Magd,"P802.11ax Report to EC on Conditional Approval to forward draft to RevCom",IEEE 802.11-20/1771r7,on Nov. 3, 2020, total 10 pages.
IEEE Std 802.11b-1999, Supplement to IEEE Standard forInformation technology Telecommunications and information exchange between systems Local and metropolitan area networks Specific requirements Part 11: Wireless LAN Medium Access Control (MAC) and Physical Layer (PHY) specifications: Higher-Speed Physical Layer Extension in the 2.4 GHz Band, Sep. 16, 1999, total 97 pages.
IEEE Std 802.11n-2009,Part 11:Wireless LAN Medium Access Control (MAC) and Physical Layer (PHY) Specifications,Amendment 5:Enhancements for Higher Throughput,dated Sep. 11, 2009, total 536 pages.
IEEE Std 802.11a-1999,Supplement to IEEE Standard for Information technology, Telecommunications and information exchange between systems, Local and metropolitan area networks Specific requirements,Part 11: Wireless LAN Medium Access Control(MAC) and Physical Layer (PHY) specifications:High-speed Physical Layer in the 5 GHZ Band, Approved Sep. 16, 1999,total 90 pages.
IEEE Std 802.11g-2003 (Amendment to IEEE Std 802.11 , 1999 Edition (Reaff 2003),IEEE Standard for Information technology Telecommunications and information exchange between systems Local and metropolitan area networks Specific requirements Part 11: Wireless LAN Medium Access Control (MAC) and Physical Layer (PHY) specifications Amendment 4: Further Higher Data Rate Extension in the 2.4 GHz Band,Jun. 27, 2003,total 78 pages.
IEEE Std 802.11-2016,IEEE Standard for Information technology-Telecommunications and information exchange between systems,Local and metropolitan area networks-Specific requirements,Part 11: Wireless LAN Medium Access Control (MAC) and Physical Layer (PHY) Specifications,Approved Dec. 7, 2016,total 3534 pages.
IEEE P802.11ax/D6.0, Nov. 2019, Draft Standard for Information technology-Tele-communications and information exchange between systems Local and metropolitan area networks-Specific requirements, Part 11: Wireless LAN Medium Access Control (MAC) and Physical Layer (PHY) Specifications, Amendment 1: Enhancements for High Efficiency WLAN, 780 pages.

* cited by examiner

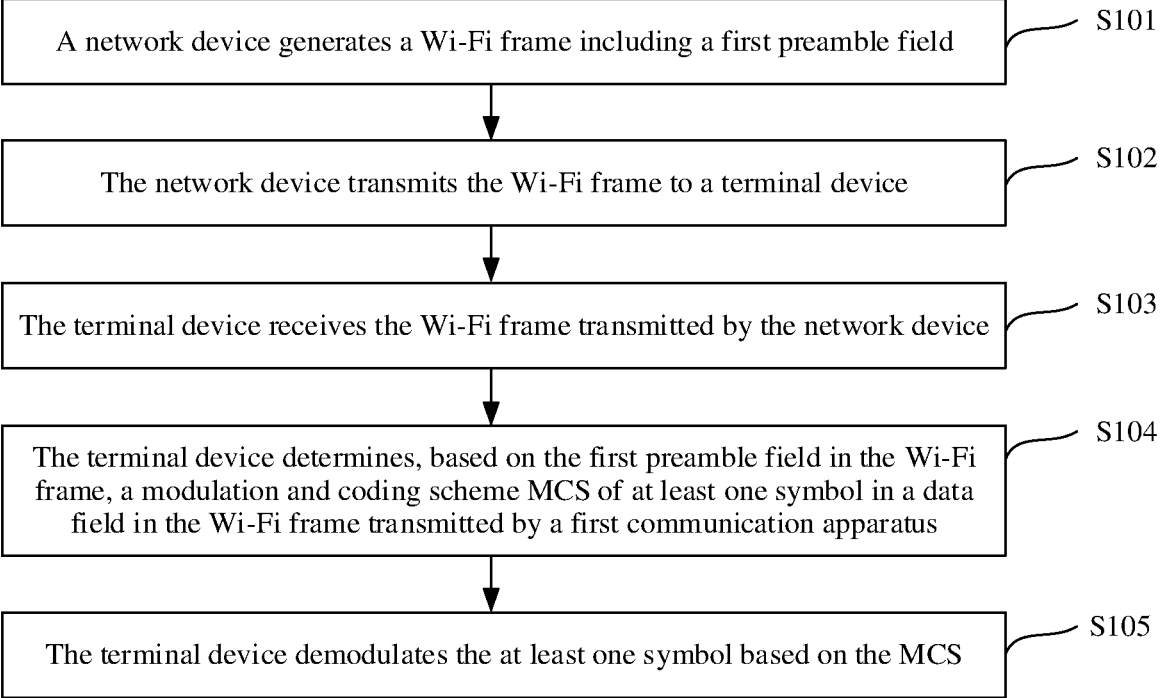

A network device generates a Wi-Fi frame including a first preamble field        S101

The network device transmits the Wi-Fi frame to a terminal device        S102

The terminal device receives the Wi-Fi frame transmitted by the network device        S103

The terminal device determines, based on the first preamble field in the Wi-Fi frame, a modulation and coding scheme MCS of at least one symbol in a data field in the Wi-Fi frame transmitted by a first communication apparatus        S104

The terminal device demodulates the at least one symbol based on the MCS        S105

FIG. 8

COMMUNICATION METHOD FOR WIRELESS FIDELITY WI-FI SYSTEM AND APPARATUS

CROSS-REFERENCE TO RELATED APPLICATIONS

This application is a continuation of International Application No. PCT/CN2020/121687, filed on Oct. 16, 2020, the disclosure of which is hereby incorporated by reference in its entirety.

TECHNICAL FIELD

This disclosure relates to the field of communication technologies, and in particular, to a method for a wireless fidelity (Wi-Fi) system and an apparatus.

BACKGROUND

A Wi-Fi technology is a wireless local area network technology in the Institute of Electrical and Electronics Engineers (IEEE) 802.11 standard developed by the Wi-Fi Alliance. Usually, two types of devices: an access point (AP) and a station (STA) are included in the Wi-Fi technology. The AP, referred to as a wireless access point, is a provider of a Wi-Fi network, allows access of another wireless device, and provides data access for the accessed device. The device that accesses the Wi-Fi network may be referred to as the STA. For example, an electronic device that supports a Wi-Fi function, such as a mobile phone, a tablet computer, and a laptop computer, can be used as the STA. User data is transmitted between the AP and the STA through a Wi-Fi physical frame (Wi-Fi frame for short).

Currently, Wi-Fi networks in 802.11g, 802.11n, 802.11a, 802.11ac, and 802.11ax protocols all use an orthogonal frequency division multiplexing (OFDM) technology. Usually, the Wi-Fi frame sent by a transmit end includes a preamble field and a data field. A scrambler seed is encoded together with a first OFDM symbol in the data field. The preamble field (a signal field A, SIGA) includes a modulation and coding scheme (MCS) order (or index value) of the data field, and MCS orders of OFDM symbols of all data fields are the same. At a receive end, when the received Wi-Fi frame is demodulated, considering a processing capability of hardware at the receive end, signal-to-noise ratios of channel estimation of first few symbols are usually low due to no enough time for performing complex channel estimation for the first few received OFDM symbols to enhance noise suppression processing. In addition, there are no enough symbols in the first few OFDM symbols used to calculate a frequency offset and phase information, and therefore, both frequency offset and phase correction capabilities are weak, and inter channel interference (ISI) and inter symbol interference (ISI) are high. However, high-order modulation is sensitive to the frequency offset and the phase. Therefore, there is a high probability that the receive end incorrectly demodulates the first OFDM symbol. The incorrect demodulation of the scrambling code results in a 50% bit error rate of data, and a failure of data packet demodulation. As a result, a system throughput is affected, and even if the scrambling code is demodulated correctly at a certain probability, there is a high probability that the first few symbols are demodulated incorrectly. However, as a requirement of a Wi-Fi system on a high throughput increases, 1024 quadrature amplitude modulation (QAM) modulation is introduced in 802.11ax, and a 4KQAM modulation scheme may be introduced in a subsequent system. Such Wi-Fi frame design has greater impact on the system. Because a radio frequency (RF) indicator is limited, a receiving capability of the system cannot be improved by improving a signal-to-noise ratio of a signal. In this case, a demodulation capability of the first OFDM symbol is weak, especially when sensitivity is near, there is a high probability that the first OFDM symbol (or even the first few OFDM symbols) is demodulated incorrectly, and a high probability that the scrambling code is demodulated incorrectly. Therefore, the incorrect demodulation of the scrambling code becomes a bottleneck for improving the throughput of an entire system link.

SUMMARY

This disclosure provides a communication method for a wireless fidelity (Wi-Fi) system and an apparatus, to improve performance of demodulating a Wi-Fi frame by the apparatus.

To achieve the foregoing objective, the following technical solutions are used in this disclosure.

According to a first aspect, a communication method for a wireless fidelity (Wi-Fi) system is provided. The method may be performed by a first communication apparatus. The first communication apparatus may be a module or a chip in the first communication apparatus, and the first communication apparatus may alternatively be a chip or a system-on-a-chip. The method includes the following steps: first, generating a Wi-Fi frame including a first preamble field, where the first preamble field indicates a modulation and coding scheme MCS of at least one symbol in a data field in the Wi-Fi frame, an MCS order of first m symbols in the at least one symbol is less than an MCS order of another symbol, and m is a positive integer greater than or equal to 1; and transmitting the Wi-Fi frame. The symbol in this solution may be an OFDM symbol. In the foregoing solution, the MCS order of the first few symbols in the data field in the Wi-Fi frame is mainly reduced, that is, compared with the another symbol after the first few symbols, the first few symbols are encoded by using the lower MCS order. In this way, a requirement on a demodulation capability of a receiver is lowered, a probability that the first few symbols are correctly demodulated is increased, and further, demodulation performance of another symbol for which high-order MCS coding is used is improved.

In a possible implementation, the first preamble field includes a first high efficient-signal field HE-SIGA; and the method further includes: determining a value by which the MCS order of the first m symbols is lower than the MCS order of the another symbol; and including the value and the MCS order of the another symbol in the first high efficient-signal field HE-SIGA. The method further includes: including, in the first high efficient-signal field HE-SIGA, a bit for indicating a value of m. For example, the first high efficient-signal field HE-SIGA of the first preamble field includes an MCS postdata field (indicating the MCS order in a postdata field (postdata, which refers to the another symbol)), an MCS diff field (indicating a difference between the MCS order in a predata field (predata, which refers to the first m symbols) and the MCS order in the postdata field, and in this embodiment of this disclosure, indicating the order by which the MCS predata field is lower than the MCS postdata field), and an Npredata field (a quantity of symbols m in the predata field).

In a possible implementation, the first preamble field includes a first high efficient-signal field HE-SIGA; and the method further includes: including an MCS order of the at least one symbol in the first high efficient-signal field HE-SIGA. The method further includes: including, in the first high efficient-signal field HE-SIGA, a bit for indicating a value of m. For example, the first high efficient-signal field HE-SIGA of the first preamble field includes an MCS postdata field (the MCS in a postdata field, which refers to the MCS order of the another symbol), an MCS predata field (the MCS order in a predata field (predata, which refers to the first m symbols)), and an Npredata field (a quantity of symbols in the predata field).

In a possible implementation, the first preamble field includes a first high efficient-signal field HE-SIGA; and the method further includes: including the MCS order of the another symbol in the first high efficient-signal field HE-SIGA. In this way, the MCS order of the first m symbols may be determined based on the MCS order of the another symbol. For example, when it is determined that the MCS order of postdata is greater than or equal to an MCS threshold order (MCSth), the MCS order of predata is fixed as MCS (0)-(MCSth−1). For example, when the MCSth is 8, and the MCS order of the symbol of postdata is 8, 9, 10, 11, 12, or 13, the MCS order of the symbol of predata is 7.

In a possible implementation, the first preamble field includes the first high efficient-signal field HE-SIGA; the first high efficient-signal field HE-SIGA includes a quantity of spatial streams of user data; and m=k*Nss, Nss is the quantity of the spatial streams, and k is a positive integer greater than or equal to 1. For example, the quantity of the spatial streams Nss is included in the first high efficient-signal field HE-SIGA. Each of the first m symbols carries one spatial stream of the user data. In this way, a second communication apparatus receives only a single stream for the first m symbols in the data field in the Wi-Fi frame. The second communication apparatus performs simple demodulation, has a low requirement on a time sequence, and has a strong capability of demodulating the single stream. In this way, when a high probability of correctly demodulating the first few symbols can be ensured, the first few symbols are used to perform channel estimation again and enhance channel estimation, to enhance a signal-to-noise ratio of the channel estimation of the second communication apparatus. In addition, frequency offset and phase capabilities may be enhanced, to improve a demodulation capability of the second communication apparatus.

In a possible implementation, the first preamble field includes a high efficient-long training field HE-LTF; and m=S, and S is a quantity of symbols of the HE-LTF. Each of the first m symbols carries a plurality of spatial streams of user data; a plurality of spatial streams of user data carried in the at least one symbol are weighted by using an orthogonal P matrix, and the orthogonal P matrix is an m*m orthogonal matrix. In this way, the first communication apparatus sends same data to the first m symbols in the data field in the Wi-Fi frame, and performs P-matrix weighting on different symbols and different streams. In this way, the terminal device can perform channel estimation again and enhance frequency offset estimation, to enhance a signal-to-noise ratio of the channel estimation of the second communication apparatus, and improve a demodulation capability of the terminal device.

In a possible implementation, a subcarrier spacing of the first m symbols is greater than a subcarrier spacing of the another symbol. A subcarrier of the symbol of predata may have a larger subcarrier spacing and a smaller symbol spacing than a subcarrier of the symbol of postdata. When the subcarrier spacing is larger, a frequency offset resistance capability can be improved. When the symbol of predata uses the lower MCS order and the larger subcarrier spacing, requirements on the signal-to-noise ratio of the channel estimation and a frequency offset correction capability are lower, a probability of incorrectly demodulating the symbol of predata is reduced, and a probability of incorrectly demodulating scrambling code is reduced. In addition, when there is a high probability that predata is correctly demodulated, predata can be used to enhance the channel estimation and phase estimation, and improve a subsequent data demodulation capability.

According to a second aspect, a communication method for a wireless fidelity (Wi-Fi) system is provided. The method may be performed by a second communication apparatus. The second communication apparatus may be a module or a chip in the second communication apparatus, and the second communication apparatus may alternatively be a chip or a system-on-a-chip. The method includes: receiving a Wi-Fi frame transmitted by a first communication apparatus; determining, based on a first preamble field in the Wi-Fi frame, a modulation and coding scheme MCS of at least one symbol in a data field in the Wi-Fi frame transmitted by the first communication apparatus, where an MCS order of first m symbols in the at least one symbol is less than an MCS order of another symbol, and m is a positive integer greater than or equal to 1; and demodulating the at least one symbol based on the MCS.

In a possible implementation, the first preamble field includes a first high efficient-signal field HE-SIGA; and the first high efficient-signal field HE-SIGA includes the MCS order of the another symbol and a value for indicating that the MCS order of the first m symbols is lower than the MCS order of the another symbol.

In a possible implementation, the first preamble field includes a first high efficient-signal field HE-SIGA; and the first high efficient-signal field HE-SIGA includes an MCS order of the at least one symbol.

In a possible implementation, the first preamble field includes a first high efficient-signal field HE-SIGA; and the first high efficient-signal field HE-SIGA includes the MCS order of the another symbol; and the determining, based on a first preamble field in the Wi-Fi frame, a modulation and coding scheme MCS of at least one symbol in a data field in the Wi-Fi frame transmitted by the first communication apparatus includes: determining the MCS order of the another symbol based on the first high efficient-signal field HE-SIGA; and determining the MCS order of the first m symbols based on the MCS order of the another symbol.

In a possible implementation, the first preamble field includes the first high efficient-signal field HE-SIGA; and the first high efficient-signal field HE-SIGA includes a bit for indicating a value of m.

In a possible implementation, the first preamble field includes the first high efficient-signal field HE-SIGA; the first high efficient-signal field HE-SIGA includes a quantity of spatial streams of user data; and m=k*Nss, Nss is the quantity of the spatial streams, and k is a positive integer greater than or equal to 1.

In a possible implementation, each of the first m symbols carries one spatial stream of the user data.

In a possible implementation, the first preamble field includes a high efficient-long training field HE-LTF; and m=S, and S is a quantity of symbols of the HE-LTF.

In a possible implementation, each of the first m symbols carries a plurality of spatial streams of user data; a plurality of spatial streams of user data carried in the at least one symbol are weighted by using an orthogonal P matrix, and the orthogonal P matrix is an m*m orthogonal matrix.

In a possible implementation, a subcarrier spacing of the first m symbols is greater than a subcarrier spacing of the another symbol.

According to a third aspect, a communication apparatus is provided. The communication apparatus may be a first communication apparatus. The first communication apparatus may be a module or a chip in the first communication apparatus, or the first communication apparatus may be a chip or a system-on-a-chip. The communication apparatus includes: a processor, configured to generate a Wi-Fi frame including a first preamble field, where the first preamble field indicates a modulation and coding scheme MCS of at least one symbol in a data field in the Wi-Fi frame, an MCS order of first m symbols in the at least one symbol is less than an MCS order of another symbol, and m is a positive integer greater than or equal to 1; and a transmitter, configured to transmit the Wi-Fi frame.

In a possible implementation, the first preamble field includes a first high efficient-signal field HE-SIGA; and the processor is further configured to: determine a value by which the MCS order of the first m symbols is lower than the MCS order of the another symbol; and include the value and the MCS order of the another symbol in the first high efficient-signal field HE-SIGA.

In a possible implementation, the first preamble field includes a first high efficient-signal field HE-SIGA; and the processor is further configured to include, in the first high efficient-signal field HE-SIGA, a bit for indicating a value of m.

In a possible implementation, the first preamble field includes a first high efficient-signal field HE-SIGA; and the processor is further configured to include an MCS order of the at least one symbol in the first high efficient-signal field HE-SIGA.

In a possible implementation, the first preamble field includes a first high efficient-signal field HE-SIGA; and the processor is further configured to include the MCS order of the another symbol in the first high efficient-signal field HE-SIGA.

In a possible implementation, the first preamble field includes the first high efficient-signal field HE-SIGA; the first high efficient-signal field HE-SIGA includes a quantity of spatial streams of user data; and m=k*Nss, Nss is the quantity of the spatial streams, and k is a positive integer greater than or equal to 1.

In a possible implementation, the first preamble field includes a high efficient-long training field HE-LTF; and m=S, and S is a quantity of symbols of the HE-LTF.

In a possible implementation, a subcarrier spacing of the first m symbols is greater than a subcarrier spacing of the another symbol.

According to a fourth aspect, a communication apparatus is provided. The communication apparatus may be a second communication apparatus. The second communication apparatus may be a module or a chip in the second communication apparatus, or the second communication apparatus may be a chip or a system-on-a-chip. The communication apparatus includes: a receiver, configured to receive a Wi-Fi frame transmitted by a first communication apparatus; and a processor, configured to: determine, based on a first preamble field in the Wi-Fi frame, a modulation and coding scheme MCS of at least one symbol in a data field in the Wi-Fi frame transmitted by the first communication apparatus, where an MCS order of first m symbols in the at least one symbol is less than an MCS order of another symbol, and m is a positive integer greater than or equal to 1; and demodulate the at least one symbol based on the MCS.

In a possible implementation, the first preamble field includes a first high efficient-signal field HE-SIGA; and the first high efficient-signal field HE-SIGA includes the MCS order of the another symbol and a value for indicating that the MCS order of the first m symbols is lower than the MCS order of the another symbol.

In a possible implementation, the first preamble field includes a first high efficient-signal field HE-SIGA; and the first high efficient-signal field HE-SIGA includes an MCS order of the at least one symbol.

In a possible implementation, the first preamble field includes a first high efficient-signal field HE-SIGA; and the first high efficient-signal field HE-SIGA includes the MCS order of the another symbol; and the processor is specifically configured to: determine the MCS order of the another symbol based on the first high efficient-signal field HE-SIGA; and determine the MCS order of the first m symbols based on the MCS order of the another symbol.

In a possible implementation, the first preamble field includes the first high efficient-signal field HE-SIGA; and the first high efficient-signal field HE-SIGA includes a bit for indicating a value of m.

In a possible implementation, the first preamble field includes the first high efficient-signal field HE-SIGA; the first high efficient-signal field HE-SIGA includes a quantity of spatial streams of user data; and m=k*Nss, Nss is the quantity of the spatial streams, and k is a positive integer greater than or equal to 1.

In a possible implementation, each of the first m symbols carries one spatial stream of the user data.

In a possible implementation, the first preamble field includes a high efficient-long training field HE-LTF; and m=S, and S is a quantity of symbols of the HE-LTF.

In a possible implementation, each of the first m symbols carries a plurality of spatial streams of user data; a plurality of spatial streams of user data carried in the at least one symbol are weighted by using an orthogonal P matrix, and the orthogonal P matrix is an m*m orthogonal matrix.

In a possible implementation, a subcarrier spacing of the first m symbols is greater than a subcarrier spacing of the another symbol.

According to a fifth aspect, a computer-readable storage medium is provided. The computer-readable storage medium stores a computer program, and when the computer program is run on a computer, the computer is enabled to perform the method according to any one of the foregoing aspects.

According to a sixth aspect, a computer program product including instructions is provided. The computer program product includes computer program code, and when the computer program code is run on a computer, the computer is enabled to perform the method according to any one of the foregoing aspects.

According to a seventh aspect, a communication system is provided. The communication system includes the first communication apparatus according to the foregoing aspects and the second communication apparatus according to the foregoing aspects. In an example, the first communication apparatus may be a network device, and the second communication apparatus may be a terminal device.

For technical effects brought by any design manner of the second to the seventh aspects, refer to the technical effects brought by different design manners of the first aspect. Details are not described herein again.

BRIEF DESCRIPTION OF DRAWINGS

FIG. 8 is a schematic flowchart of a communication method for a wireless fidelity (Wi-Fi) system according to an embodiment of this disclosure;

DESCRIPTION OF EMBODIMENTS

The following describes technical solutions of this disclosure with reference to accompanying drawings.

All aspects, embodiments, or features are presented in this disclosure by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used. In addition, in embodiments of this disclosure, terms such as "example" and "for example" are used to represent giving an example, an illustration, or a description. Any embodiment or design scheme described as an "example" in this disclosure should not be explained as being more preferred or having more advantages than another embodiment or design scheme. Specifically, the term "example" is used to present a concept in a specific manner. In embodiments of this disclosure, terms "information", "signal", "message", "channel", and "signaling may be interchangeably used sometimes. It should be noted that meanings expressed by the terms are consistent when differences between the terms are not emphasized. Terms "of" and "corresponding (relevant)" may be interchangeably used sometimes. It should be noted that meanings expressed by the terms are consistent when differences between the terms are not emphasized.

A network architecture and a service scenario described in embodiments of this disclosure are intended to describe the technical solutions in embodiments of this disclosure more clearly, and do not constitute a limitation on the technical solutions provided in embodiments of this disclosure. A person of ordinary skill in the art may learn that, with evolution of the network architecture and emergence of new service scenarios, the technical solutions provided in embodiments of this disclosure are also applicable to similar technical problems.

In addition, terms "including", "having", or any other variant thereof in descriptions of this disclosure are intended to cover a non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the product, or the device.

Figure 1:
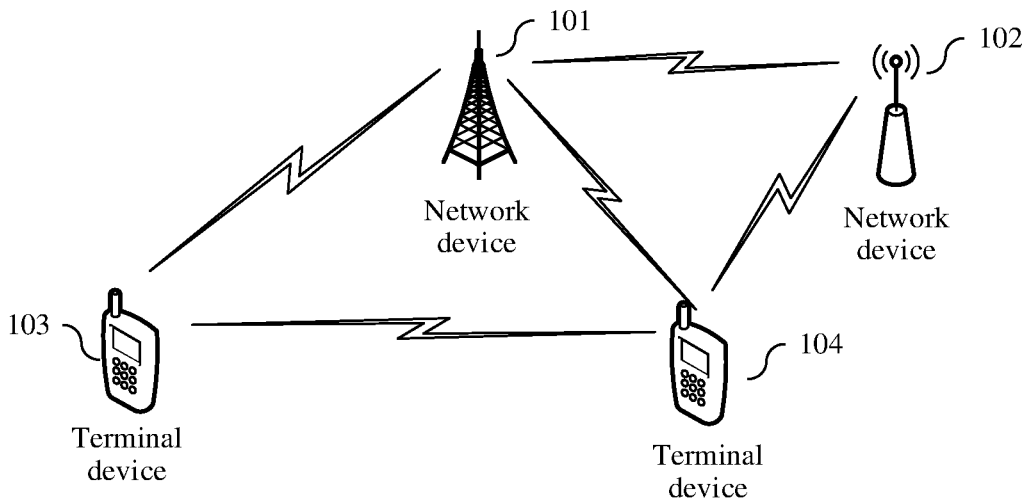
FIG. 1 is a schematic diagram of a structure of a communication system according to an embodiment of this disclosure.

For ease of understanding embodiments of this disclosure, a communication system shown in FIG. 1 is first used as an example to describe in detail a communication system applicable to embodiments of this disclosure. FIG. 1 is a schematic diagram of a communication system applicable to a communication method for a wireless fidelity (Wi-Fi) system according to an embodiment of this disclosure. As shown in FIG. 1, the communication system includes a network device 101 and a terminal device 103. A plurality of antennas may be configured for each of the network device 101 and the terminal device 103. Optionally, the communication system may further include another network device and/or another terminal device, for example, a network device 102 and a terminal device 104, and a plurality of antennas may also be configured for each of the network device 102 and the terminal device 104.

It should be understood that the network device and the terminal device may further include a plurality of components (for example, a processor, an encoder, a decoder, a modulator, a demodulator, a multiplexer, a demultiplexer, and the like) related to signal sending and receiving.

For example, the network device may be a device with a wireless transceiver function or a chip that can be disposed in the network device. The network device includes but is not limited to an access point (AP) in a Wi-Fi system, an evolved NodeB (eNB), a home NodeB (for example, a home evolved NodeB, or a home NodeB, HNB), a wireless relay node, a wireless backhaul node, a transmission point (TP, or transmission and reception point, (TRP)), or the like. Alternatively, the network device may be a gNB in a new radio (NR) system, a communication server, a router, a switch, a bridge, a computer, or the like.

For example, the terminal device may also be referred to as user equipment (UE), an access terminal, a subscriber unit, a subscriber station, a mobile station, a mobile console, a remote station, a remote terminal, a mobile device, a user terminal, a wireless communication device, a user agent, or a user apparatus. In embodiments of this disclosure, the terminal device may be a non-access point station (NON-STA or STA), a mobile phone, a tablet computer (Pad), a computer with a wireless transceiver function, a virtual reality (VR) terminal, a wireless terminal in a smart city, a wireless terminal in a smart home, or the like. In embodiments of this disclosure, the terminal device and a chip that can be disposed in the terminal device are collectively referred to as a terminal device.

In the communication system, one network device or one terminal device may be treated as one node, and communication in any form such as a one-to-one form, a one-to-many form, a many-to-one form, or a many-to-many form may exist between any two or more nodes. For example, a same network device may communicate with at least one terminal device and/or at least one network device, and a same terminal device may also communicate with at least one network device and/or at least one terminal device. For example, as shown in FIG. 1, the network device 101 may communicate with the terminal device 103, or may communicate with the network device 102, or may simultaneously communicate with at least two of the terminal device 103, the terminal device 104, and the network device 102. For another example, the terminal device 104 may communicate with the network device 101, or may communicate with the terminal device 103, or may communicate with at least two of the network device 101, the network device 102, and the terminal device 103.

It should be understood that FIG. 1 is merely a simplified schematic diagram of an example for ease of understanding. The communication system may further include another network device or another terminal device that is not shown in FIG. 1.

Figure 2:
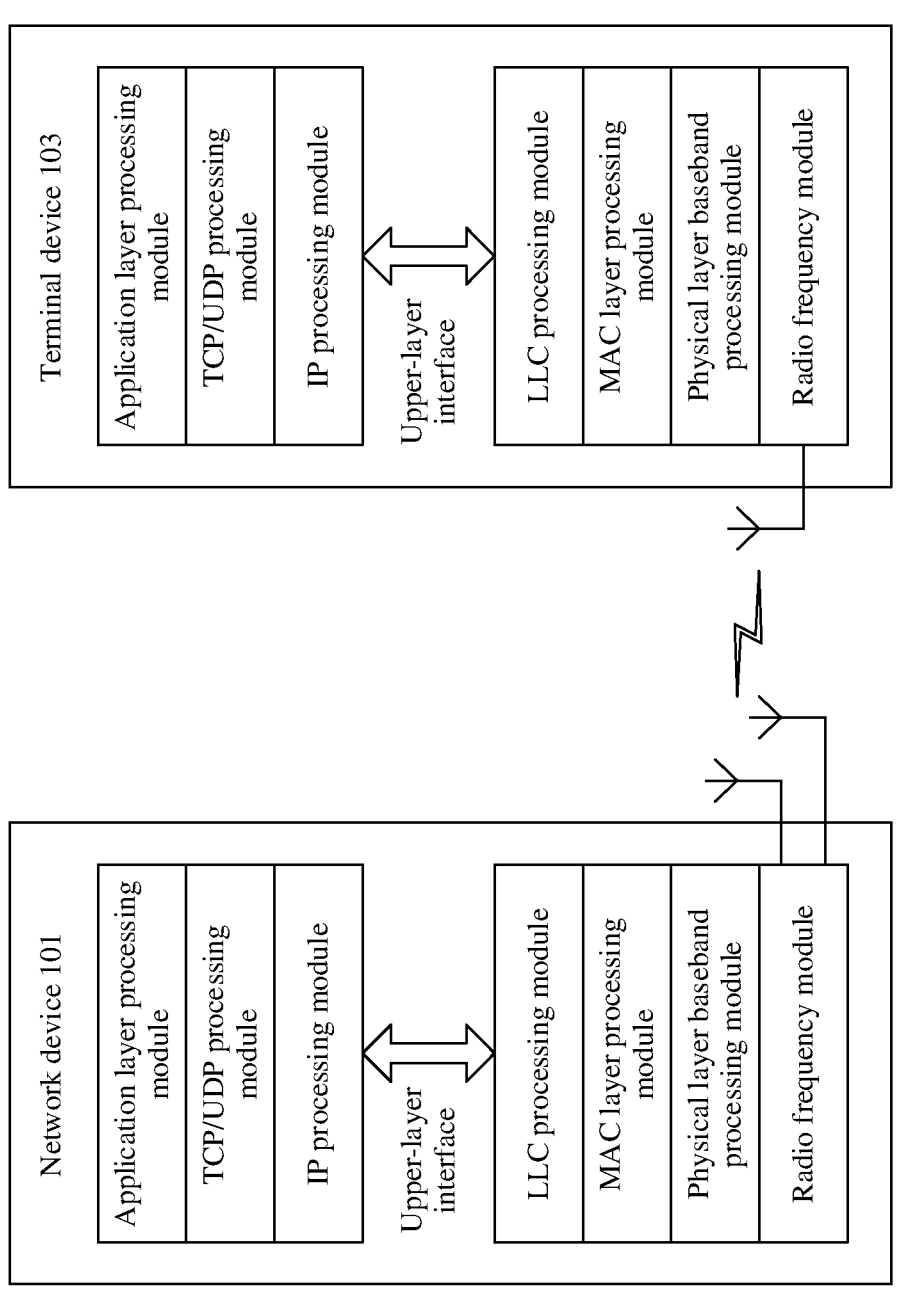
FIG. 2 is a schematic diagram of internal structures of a terminal device and a network device according to an embodiment of this disclosure.

FIG. 2 is a schematic diagram of internal structures of the network device 101 and the terminal device 103. As shown in FIG. 2, the network device 101 and the terminal device 103 each include an application layer processing module, a transmission control protocol (TCP)/user datagram protocol (UDP) processing module, an internet protocol (IP) processing module, a logical link control (LLC) processing module, a media access control (MAC) layer processing module, a physical layer baseband processing module, a radio frequency module, and an antenna. The IP processing module is connected to the LLC processing module through an upper-layer interface.

For a transmitter such as the network device 101, physical layer baseband processing module is configured to perform channel coding on binary user data, that is, an information bit, to generate an encoded bit, modulate the encoded bit to generate a modulated symbol, then perform up-conversion on the modulated symbol to generate a radio frequency signal, and send the radio frequency signal by using the antenna. For a receiver such as the terminal device 103, the physical layer baseband processing module is configured to perform down-conversion and demodulation on the radio frequency signal received by the radio frequency module to recover the encoded bit, and perform channel decoding on the encoded bit to recover the information bit, to complete sending and receiving of the information bit, that is, the binary user data.

It should be noted that FIG. 2 shows only the network device 101 configured with two antennas and the terminal device 103 configured with one antenna. In actual application, one or more antennas may be configured for each of the network device 101 and the terminal device 103.

Actually, in modern communication systems, a multiple-antenna technology is widely used in systems such as Wi-Fi, LTE, and 5G NR. A node such as the network device 101 or the terminal device 103 may send or receive a signal by using a plurality of antennas, which is referred to as a multiple-input multiple-output (MIMO) technology for short. In a communication system that supports MIMO, a node may obtain gains such as diversity and multiplexing by adjusting a MIMO sending/receiving solution, for example, adjusting a weight of a transmit antenna or allocating different signals to different antennas, to increase a system capacity and improve system reliability. In embodiments of this disclosure, data transmitted between a transmit antenna and a receive antenna of each pair is treated as a spatial stream (SS), which is referred to as a stream for short.

Figure 3:
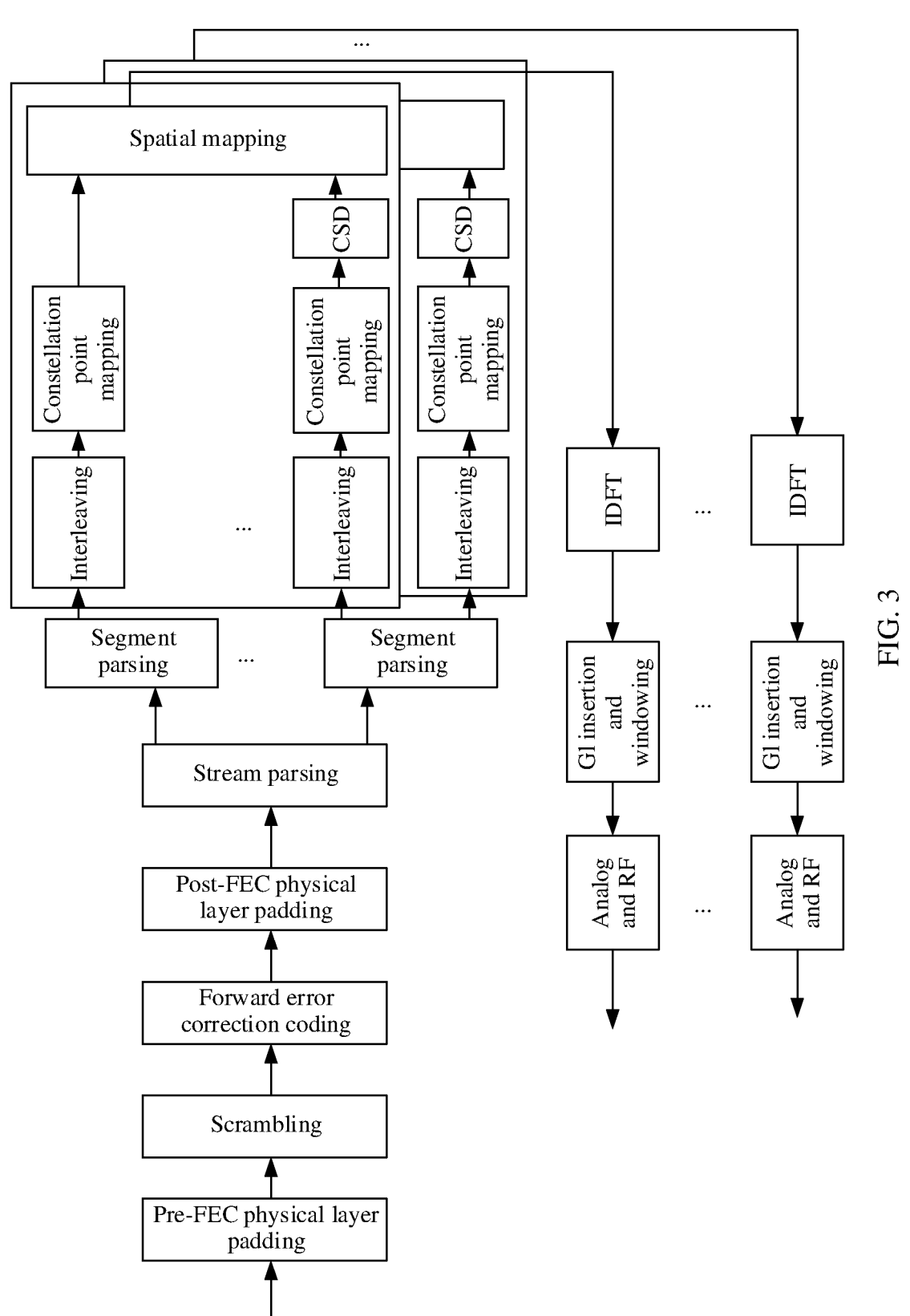
FIG. 3 is a schematic diagram of a transmission process of a transmitter in an 802.11ax Wi-Fi protocol according to an embodiment of this disclosure.

As shown in FIG. 3, a transmission process of a transmitter in an 802.11ax Wi-Fi protocol mainly includes the following steps: pre-FEC PHY padding, scrambling, forward error correction encoding, post-FEC PHY padding, stream parsing, segment parsing, interleaving, constellation point mapping, cyclic shift diversity, spatial mapping, inverse discrete Fourier transform (IDFT), guard interval insertion and windowing (GI&W), and analog and radio frequency (A&RF). The 802.11ax protocol stipulates that low-density parity-check code (LDPC) needs to be used as forward error correction code for a physical layer protocol data unit (PPDU) sent on a resource unit (RU) greater than 20 MHz. In other words, binary convolutional coding (BCC) is a coding scheme required for any one of resource units RU26, RU52, RU106, and RU242, and LDPC is a coding scheme required for any one of resource units RU484, RU996, and RU996*2. Certainly, in addition to the foregoing required coding schemes, each type of resource unit may have a candidate coding scheme, and details are not described herein.

Figure 4:
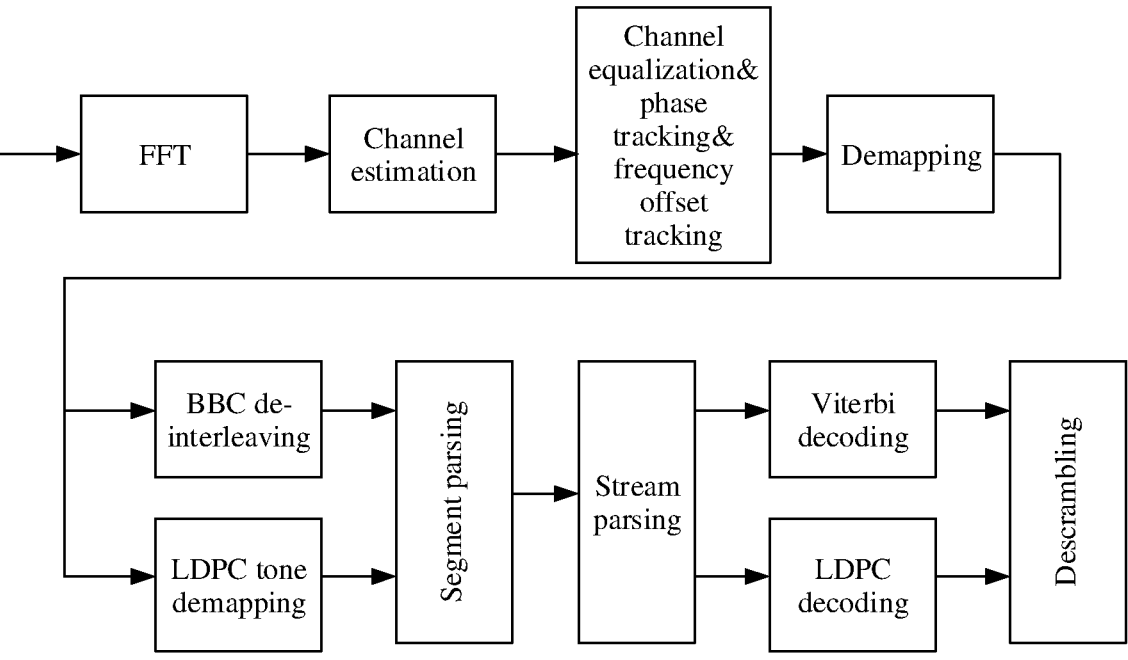
FIG. 4 is a schematic diagram of a transmission process of a receiver in an 802.11ax Wi-Fi protocol according to an embodiment of this disclosure.

As shown in FIG. 4, a transmission process of a receiver in an 802.11ax Wi-Fi protocol mainly includes the following processes: discrete Fourier transform (DFT), channel estimation, channel equalization&phase tracking&frequency offset tracking, demapping, BCC de-interleaving or LDPC tone demapping, segment parsing, stream parsing, Viterbi decoding or LDPC decoding, and descrambling.

Figure 5:
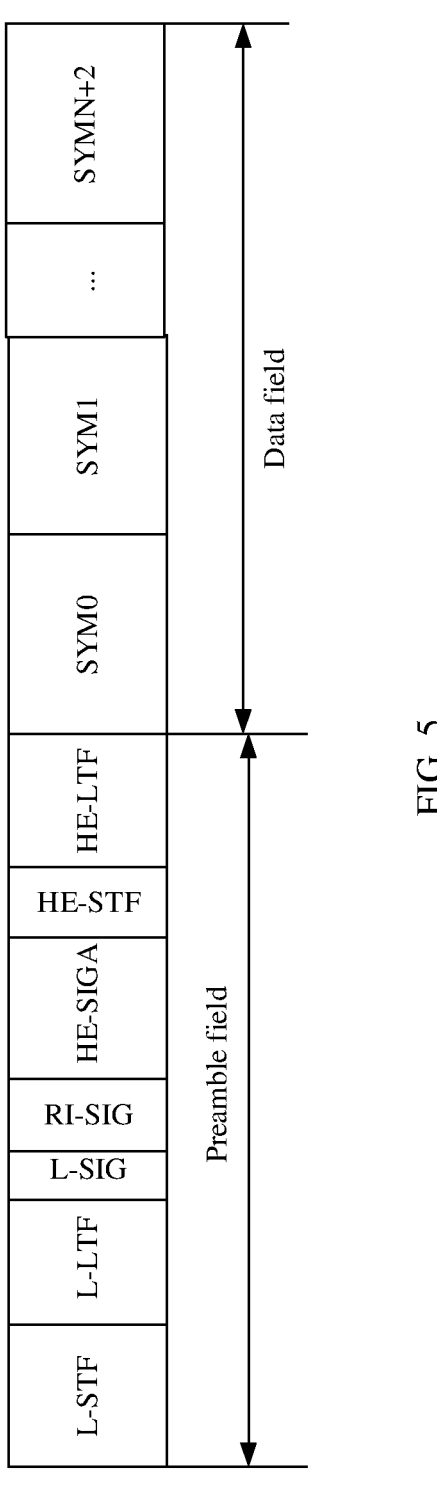
FIG. 5 is a schematic diagram of a structure of a Wi-Fi frame according to an embodiment of this disclosure.

A Wi-Fi physical frame transmitted in the foregoing transmission process is also referred to as a Wi-Fi frame. Refer to FIG. 5. In the 802.11ax, the Wi-Fi physical frame is used as a physical layer convergence protocol (PLCP) data unit (PPDU). A Wi-Fi frame structure includes a preamble field and a data field, where the data field is used as a PLCP service data unit (PSDU). The preamble field includes a legacy-short training field (L-STF), a legacy-long training field (L-LTF), a legacy-signal field (L-SIG), a repeated legacy-signal field (RL-SIG), a high efficient-signal field A (HE-SIGA), a high efficient-short training field (HE-STF), and a high efficient-long training field (HE-LTF). The data field includes a plurality of symbols (for example, may be OFDM symbols), for example, a symbol 0 (referred to as SYM0 for short) to a symbol N+2 (referred to as SYMN+2 for short). Usually, a transmitter fills an encoded bit of user data in the symbol to transmit the encoded bit to the receiver. Currently, the transmitter mainly performs a coding process before the stream parsing on the user data based on an MCS order indicated by the HE-SIGA of the Wi-Fi frame. In the process, each symbol uses a same MCS. After 1024QAM modulation or an even higher-order modulation scheme is introduced in 802.11ax, in actual demodulation of the received Wi-Fi frame by the receiver, considering a processing capability of hardware, it is very likely that there is not enough time for performing complex channel estimation for first few received symbols to enhance noise suppression processing. Therefore, signal-to-noise ratios of channel estimation of the first few symbols are usually weak. In addition, the first few symbols do not have enough symbols to calculate frequency offset and phase information, and therefore, both frequency offset and phase correction capabilities are weak, and inter channel interference and inter symbol interference are high. However, the high-order modulation is sensitive to the frequency offset and the phase. Therefore, there is a high probability that the receiver incorrectly demodulates the first few received symbols, and the incorrect demodulation of scrambling code results in a 50% bit error rate of data, and a failure of data packet demodulation. As a result, a throughput is affected, and even if the scrambling code is demodulated correctly at a certain probability, there is a high probability that the first few symbols are demodulated incorrectly. In this disclosure, an MCS order of the first few symbols in the data field is mainly reduced, that is, compared with the another symbol after the first few symbols, the first few symbols are encoded by using the lower MCS order. In this way, a requirement on a demodulation capability of the receiver is lowered, a probability that the first few symbols are correctly demodulated is increased, and further, demodulation performance of another symbol for which high-order MCS coding is used is improved.

Optionally, the network device 101 and the terminal device 103 in this embodiment of this disclosure may also be referred to as a communication apparatus. For example, the network device 101 is referred to as a first communication apparatus, and the terminal device 103 is referred to as a second communication apparatus. The network device 101 and the terminal device 103 may be a general-purpose device or a dedicated device. This is not specifically limited in this embodiment of this disclosure.

Figure 6:
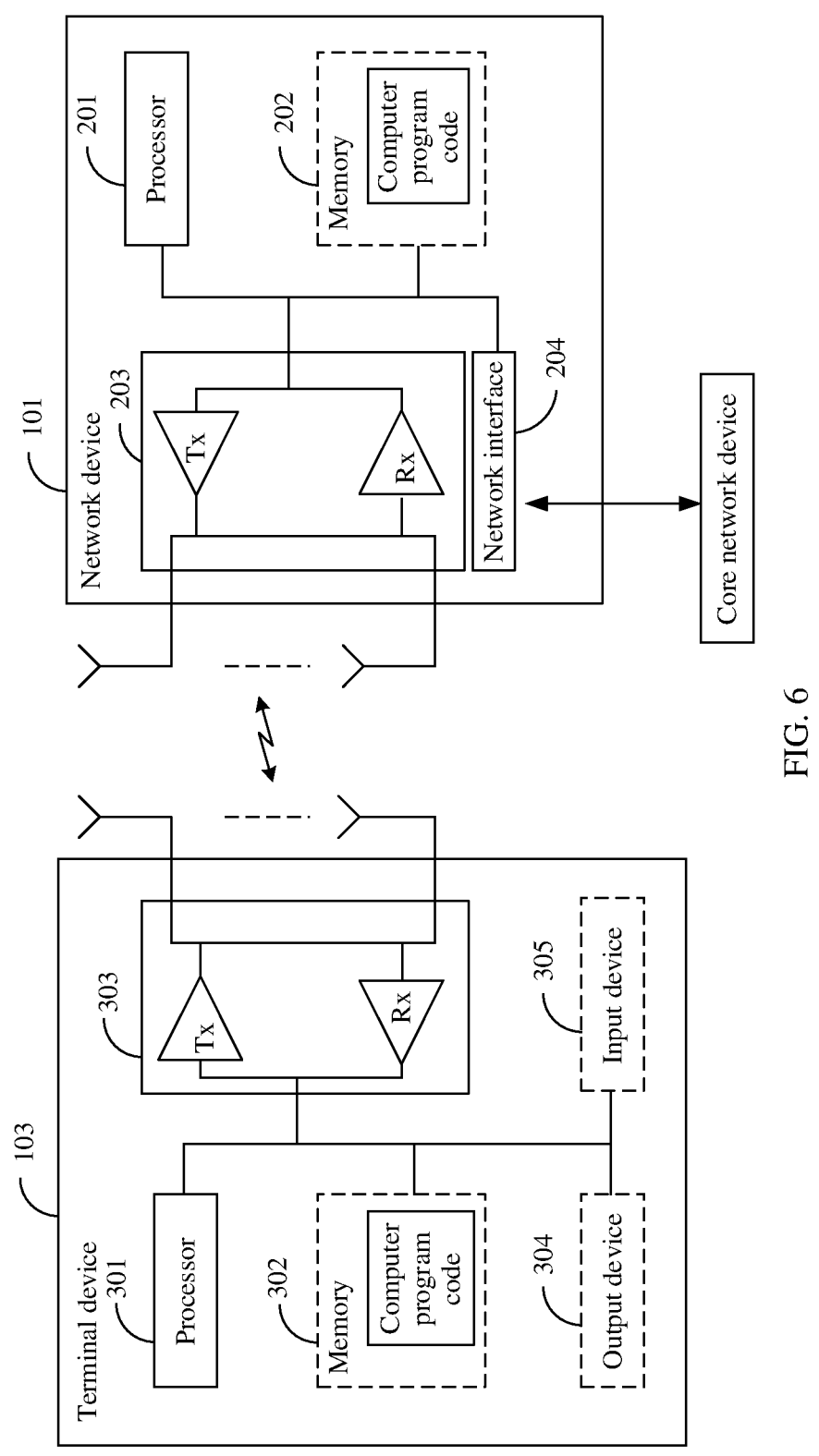
FIG. 6 is a schematic diagram of hardware structures of a terminal device and a network device according to an embodiment of this disclosure.

Optionally, FIG. 6 is a schematic diagram of structures of the network device 101 and the terminal device 103 according to an embodiment of this disclosure.

The terminal device 103 includes at least one processor (an example in which one processor 301 is included is used for description in FIG. 6) and at least one transceiver (an example in which one transceiver 303 is included is used for description in FIG. 6). Optionally, the terminal device 103 may further include at least one memory (an example in which one memory 302 is included is used for description in FIG. 6), at least one output device (an example in which one output device 304 is included is used for description in FIG. 6), and at least one input device (an example in which one input device 305 is included is used for description in FIG. 6).

The processor 301, the memory 302, and the transceiver 303 are connected through a communication line. The communication line may include a path for transmitting information between the foregoing components.

The processor 301 may be a general-purpose central processing unit (CPU), a microprocessor, an application-specific integrated circuit (ASIC), or one or more integrated circuits configured to control program execution of the solutions in this disclosure. In specific implementation, in an embodiment, the processor 301 may alternatively include a plurality of CPUs, and the processor 301 may be a single-core (single-CPU) processor or a multi-core (multi-CPU) processor. The processor herein may be one or more devices, circuits, or processing cores configured to process data (for example, computer program instructions).

The memory 302 may be an apparatus having a storage function. For example, the memory 302 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, this is not limited thereto. The memory 302 may exist independently, and is connected to the processor 301 through the communication line. The memory 302 may alternatively be integrated with the processor 301.

The memory 302 is configured to store computer-executable instructions for executing the solutions of this disclosure, and the execution is controlled by the processor 301. Specifically, the processor 301 is configured to execute the computer-executable instructions stored in the memory 302, to implement the communication method for the wireless fidelity (Wi-Fi) system in embodiments of this disclosure.

Alternatively, optionally, in this embodiment of this disclosure, the processor 301 may perform a processing-related function in the communication method for the wireless fidelity (Wi-Fi) system provided in the following embodiments of this disclosure, and the transceiver 303 is responsible for communicating with another device or a communication network. This is not specifically limited in this embodiment of this disclosure.

Optionally, the computer-executable instructions in this embodiment of this disclosure may also be referred to as application program code or computer program code. This is not specifically limited in this embodiment of this disclosure.

The transceiver 303 may use any apparatus such as a transceiver, and is configured to communicate with another device or a communication network. The transceiver 303 includes a transmitter (Tx) and a receiver (Rx). For example, in this embodiment of this disclosure, the terminal device 103 receives a Wi-Fi frame by using the receiver.

The output device 304 communicates with the processor 301, and may display information in a plurality of manners. For example, the output device 304 may be a liquid crystal display (LCD), a light-emitting diode (LED) display device, a cathode ray tube (CRT) display device, a projector, or the like.

The input device 305 communicates with the processor 301, and may receive an input of a user in a plurality of manners. For example, the input device 305 may be a mouse, a keyboard, a touchscreen device, a sensor device, or the like.

The network device 101 includes at least one processor (an example in which one processor 201 is included is used for description in FIG. 6), at least one transceiver (an example in which one transceiver 203 is included is used for description in FIG. 6), and at least one network interface (an example in which one network interface 204 is included is used for description in FIG. 6). Optionally, the network device 101 may further include at least one memory (an example in which one memory 202 is included is used for description in FIG. 6). The processor 201, the memory 202, the transceiver 203, and the network interface 204 are connected through a communication line. The network interface 204 is configured to connect to a core network device through a link (such as an S1 interface), or connect to a network interface of another network device through a wired or wireless link (such as an X2 interface) (not shown in FIG. 6). This is not specifically limited in this embodiment of this disclosure. In addition, for related descriptions of the processor 201, the memory 202, and the transceiver 203, refer to the descriptions of the processor 301, the memory 302, and the transceiver 303 in the terminal device 103. Details are not described herein again. The transceiver 203 may use any apparatus such as a transceiver, and is configured to communicate with another device or a communication network. The transceiver 203 includes a transmitter (Tx) and a receiver (Rx). For example, in this embodiment of this disclosure, the network device 101 transmits a Wi-Fi frame by using the transmitter.

Figure 7:
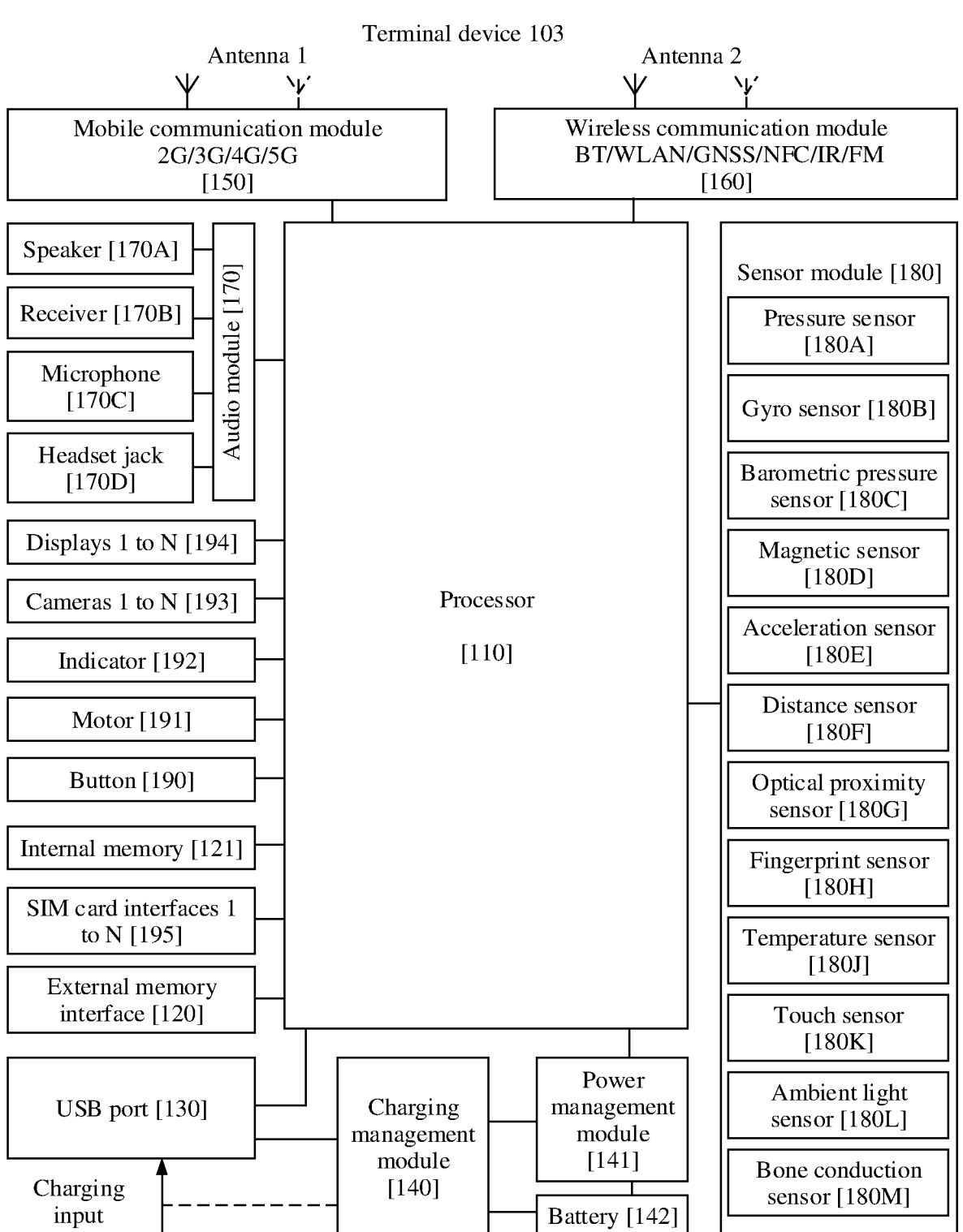
FIG. 7 is a schematic diagram of a hardware structure of a terminal device according to an embodiment of this disclosure.

With reference to the schematic diagram of the structure of the terminal device 103 shown in FIG. 6, for example, FIG. 7 shows a specific form of a structure of the terminal device 103 according to an embodiment of this disclosure.

In some embodiments, a function of the processor 301 in FIG. 6 may be implemented by a processor 110 in FIG. 7.

In some embodiments, a function of the transceiver 303 in FIG. 6 may be implemented through an antenna 1, an antenna 2, a mobile communication module 150, a wireless communication module 160, and the like in FIG. 7.

The antenna 1 and the antenna 2 are configured to transmit and receive an electromagnetic wave signal. Each antenna in the terminal device 103 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the terminal device 103. The mobile communication module 150 may include at least one filter, a switch, a power amplifier, a low noise amplifier (LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave by using the antenna 1 for radiation. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that includes a wireless local area network (WLAN) (for example, a Wi-Fi network), Bluetooth (BT), a global navigation satellite system (GNSS), frequency modulation (FM), near field communication (NFC), an infrared (IR) technology, or the like and that is applied to the terminal device 103. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave by using the antenna 2 for radiation. When the terminal device 103 is a first device, that the wireless communication module 160 may provide a solution used for NFC wireless communication on the terminal device 103 means that the first device includes an NFC chip. The NFC chip may improve an NFC wireless communication function. When the terminal device 103 is a second device, that the wireless communication module 160 may provide a solution used for NFC wireless communication on the terminal device 103 means that the first device includes an electronic label (for example, a radio frequency identification (RFID) label). When approaching the electronic label, an NFC chip of another device may perform NFC wireless communication with the second device.

In some embodiments, in the terminal device 103, the antenna 1 and the mobile communication module 150 are coupled, and the antenna 2 and the wireless communication module 160 are coupled, so that the terminal device 103 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, or the like. The GNSS may include a global positioning system (GPS), a global navigation satellite system (GLONASS), a BeiDou navigation satellite system (BDS), a quasi-zenith satellite system (QZSS), or a satellite based augmentation system (SBAS).

In some embodiments, a function of the memory 302 in FIG. 6 may be implemented by an internal memory 121 or an external memory (such as a Micro SD card) connected to an external memory interface 120 in FIG. 7, or the like.

In some embodiments, a function of the output device 304 in FIG. 6 may be implemented by a display 194 in FIG. 7. The display 194 is configured to display an image, a video, and the like. The display 194 includes a display panel.

In some embodiments, a function of the input device 305 in FIG. 6 may be implemented by a mouse, a keyboard, a touchscreen device, or a sensor module 180 in FIG. 7. For example, as shown in FIG. 7, the sensor module 180 may include one or more of a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not specifically limited in this embodiment of this disclosure.

In some embodiments, as shown in FIG. 7, the terminal device 103 may further include one or more of an audio module 170, a camera 193, an indicator 192, a motor 191, a button 190, a SIM card interface 195, a USB port 130, a charging management module 140, a power management module 141, and a battery 142. The audio module 170 may be connected to a speaker 170A (which is also referred to as a "loudspeaker"), a receiver 170B (which is also referred to as an "earpiece"), a microphone 170C (which is also referred to as a "mike" or a "mic"), a headset jack 170D, or the like. This is not specifically limited in this embodiment of this disclosure.

It may be understood that the structure shown in FIG. 7 does not constitute a specific limitation on the terminal device 103. For example, in some other embodiments of this disclosure, the terminal device 103 may include more or fewer components than those shown in the figure, or combine some components, or split some components, or have different component arrangements. The components shown in the figure may be implemented by hardware, software, or a combination of software and hardware.

With reference to FIG. 1 to FIG. 7, the following describes in detail a communication method for a wireless fidelity (Wi-Fi) system provided in an embodiment of this disclosure by using an example in which the network device shown in FIG. 1 interacts with any terminal device.

It should be noted that names of messages between network elements, names of parameters in the messages, or the like in the following embodiments of this disclosure are merely examples, and there may be other names in a specific implementation. This is not specifically limited in embodiments of this disclosure.

FIG. 8 shows a communication method for a wireless fidelity (Wi-Fi) system according to an embodiment of this disclosure. Descriptions are provided by using an example in which a network device transmits a Wi-Fi frame to a terminal device. The communication method for the wireless fidelity (Wi-Fi) system includes step S101 to step S105.

S101: The network device generates the Wi-Fi frame including a first preamble field.

Figure 9:
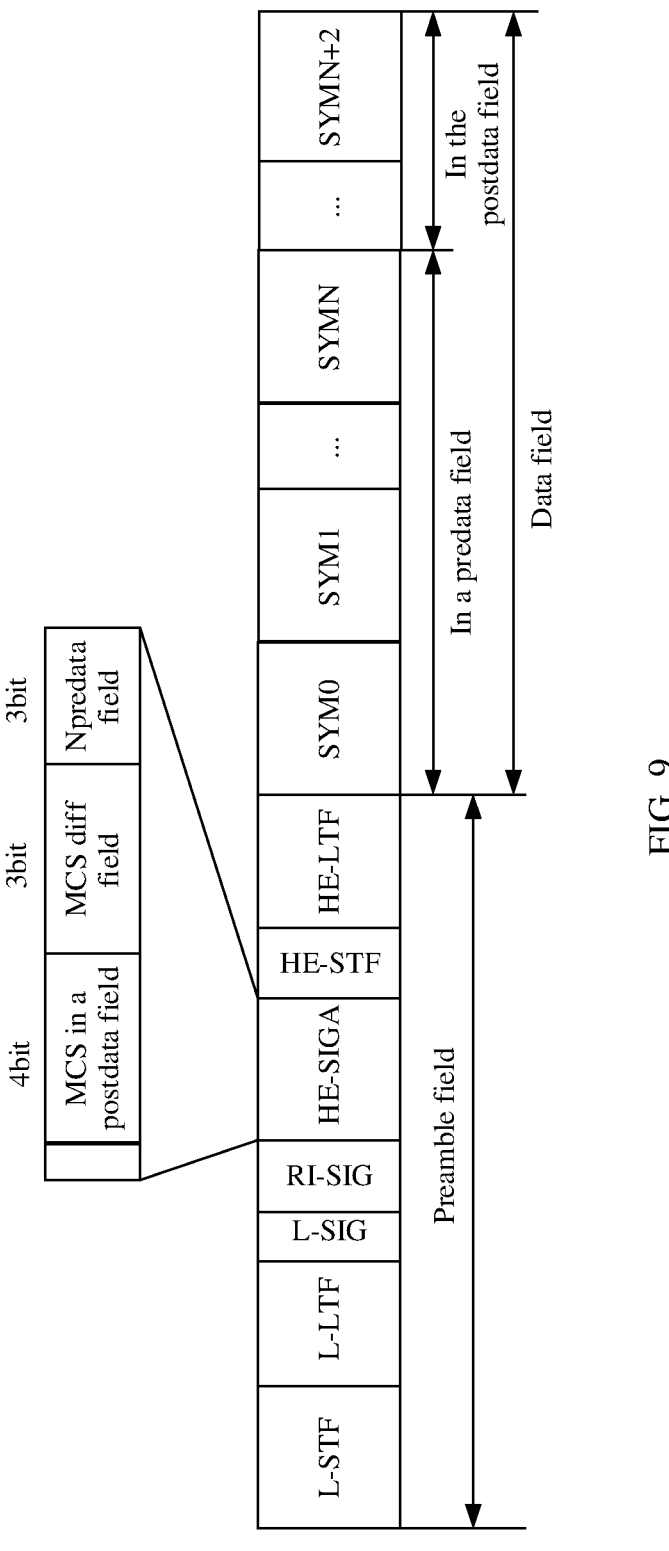
FIG. 9 is a schematic diagram of a structure of a Wi-Fi frame according to another embodiment of this disclosure.

An example of the first preamble field is shown in FIG. 9. Content included in the first preamble field is similar to that in FIG. 5, and details are not described again. The first preamble field indicates a modulation and coding scheme MCS of at least one symbol in a data field in the Wi-Fi frame, an MCS order of first m symbols in the at least one symbol is less than an MCS order of another symbol, and m is a positive integer greater than or equal to 1.

In an example 1, the first preamble field includes a first high efficient-signal field HE-SIGA. The method further includes: determining a value by which the MCS order of the first m symbols is lower than the MCS order of the another symbol; including the value and the MCS order of the another symbol in the first high efficient-signal field HE-SIGA; and including, in the first high efficient-signal field HE-SIGA, a bit for indicating a value of m. In this way, the first high efficient-signal field HE-SIGA of the first preamble field includes the MCS order of the another symbol, the value for indicating that the MCS order of the first m symbols is lower than the MCS order of the another symbol, and the bit for indicating the value of m.

Refer to the Wi-Fi frame shown in FIG. 9. The first high efficient-signal field HE-SIGA of the first preamble field includes an MCS postdata field (indicating the MCS order in a postdata field (postdata, which refers to the another symbol)), an MCS diff field (indicating a difference between the MCS order in a predata field (predata, which refers to the first m symbols) and the MCS order in the postdata field, and in this embodiment of this disclosure, indicating the order by which MCS predata is lower than MCS postdata), and an Npredata field (a quantity m of symbols in the predata field).

Four bits (4 bits) of the MCS postdata field of the HE-SIGA indicate the MCS order of the another symbol. As shown in Table 1, the four bits of the MCS postdata field can indicate values 0 to 13 of the MCS order of the symbol of postdata.

TABLE 1

| HE-SIGA MCS postdata field 0 bit | HE-SIGA MCS postdata field 1 bit | HE-SIGA MCS postdata field 2 bits | HE-SIGA MCS postdata field 3 bits | MCS order |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 1 | 10 |
| 1 | 1 | 0 | 0 | 11 |
| 1 | 1 | 0 | 1 | 12 |
| 1 | 1 | 1 | 0 | 13 |

Three bits of the MCS diff field of the HE-SIGA indicate that the symbol of predata is M orders lower than the MCS of the symbol of postdata (for example, M>=1 and M<=8), as shown in Table 2.

TABLE 2

| HE-SIGA MCS diff field 0 bit | HE-SIGA MCS diff field 1 bit | HE-SIGA MCS diff field 2 bits | M |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 |

Refer to the frame structure shown in FIG. 9. Three bits of the Npredata field of the HE-SIGA indicate an MCS order used in first $m=N_{predata}$ ($N_{predata}>=1$ and $N_{predata}<=8$) symbols. A mapping relationship between the three bits of Npredata and the quantity (m) of the symbols is shown in Table 3.

TABLE 3

| HE-SIGA Npredata field 0 bit | HE-SIGA Npredata field 1 bit | HE-SIGA Npredata field 2 bits | $N_{predata}$ |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 |

In an example 2, the first preamble field includes a first high efficient-signal field HE-SIGA. The method further includes: including an MCS order of the at least one symbol in the first high efficient-signal field HE-SIGA; and including, in the first high efficient-signal field HE-SIGA, a bit for indicating a value of m. The first high efficient-signal field HE-SIGA of the first preamble field carries the MCS order of the at least one symbol in the data field in the Wi-Fi frame.

Figure 10:
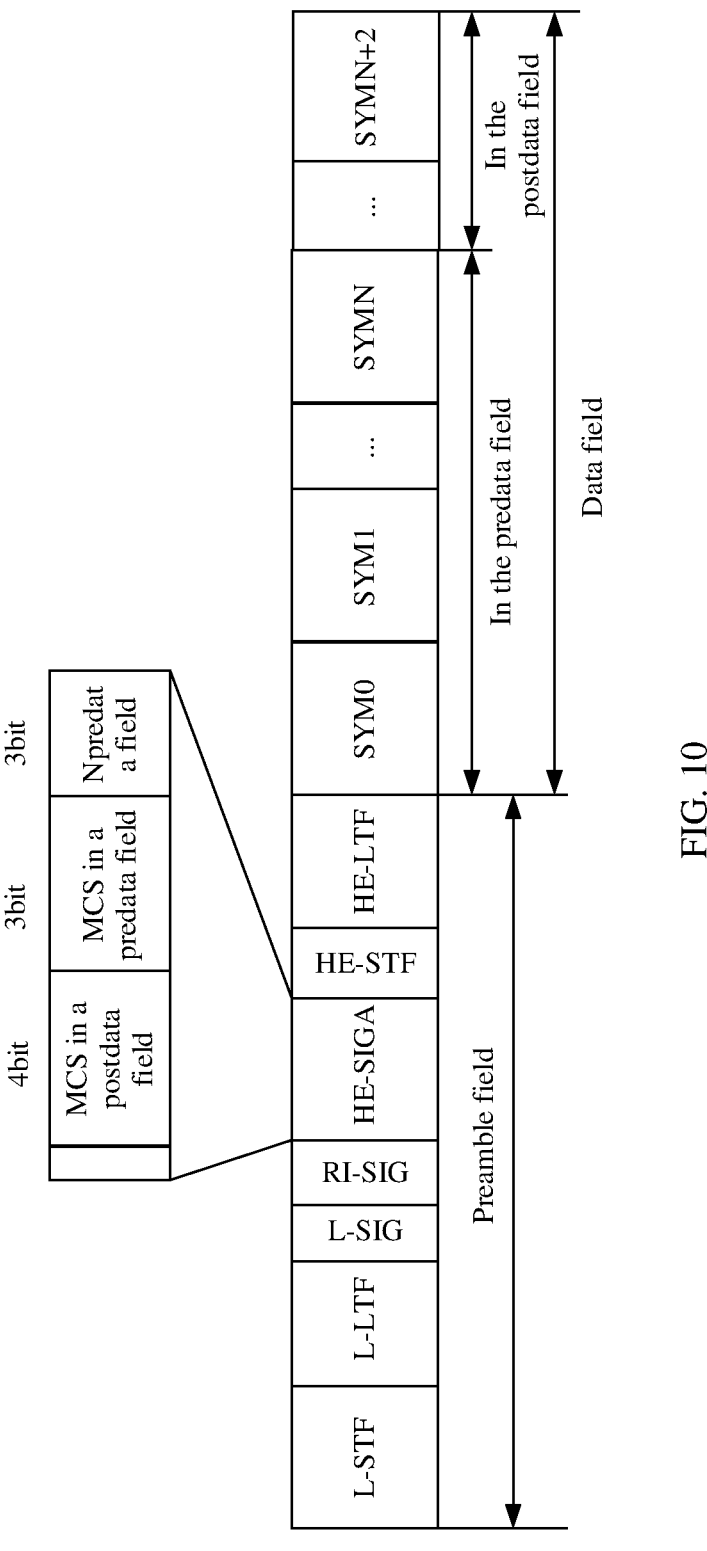
FIG. 10 is a schematic diagram of a structure of a Wi-Fi frame according to still another embodiment of this disclosure.

With reference to FIG. 10, an example of a Wi-Fi frame is provided. The first high efficient-signal field HE-SIGA of the first preamble field includes an MCS postdata field (the MCS order in a postdata field, which refers to the MCS order of the another symbol), an MCS predata field (the MCS order in a predata field (predata, which refers to the first m symbols)), and an Npredata field (a quantity of symbols in the predata field).

Four bits (4 bits) of the MCS postdata field of the HE-SIGA indicate the MCS order of the another symbol. As shown in Table 1, the four bits of the MCS postdata field can indicate values 0 to 13 of the MCS order of postdata.

Three bits of the MCS predata field of the HE-SIGA indicate the MCS order of the symbol of predata. A mapping relationship between the three bits of the MCS predata field and the MCS order of the symbol of predata is shown in Table 4.

TABLE 4

| HE-SIGA MCS predata field 0 bit | HE-SIGA2 MCS predata field 1 bit | HE-SIGA2 MCS predata field 2 bits | MCS order of the symbol of predata |
|---|---|---|---|
| 0 | 0 | 0 | 3 |
| 0 | 0 | 1 | 4 |
| 0 | 1 | 0 | 5 |
| 0 | 1 | 1 | 6 |
| 1 | 0 | 0 | 7 |
| 1 | 0 | 1 | 8 |
| 1 | 1 | 0 | 9 |
| 1 | 1 | 1 | 10 |

For example, refer to the frame structure shown in FIG. 10. Three bits of the Npredata field of the HE-SIGA indicate an MCS order used in first $m=N_{predata}$ ($N_{predata}>=1$ and $N_{predata}<=8$) symbols. A mapping relationship between the three bits of the Npredata field and the quantity (m) of the symbols is shown in Table 3.

In an example 3, the first preamble field includes a first high efficient-signal field HE-SIGA. The method further includes: including the MCS order of the another symbol in the first high efficient-signal field HE-SIGA. In this way, the MCS order of the first m symbols may be determined based on the MCS order of the another symbol. For example, when it is determined that the MCS of postdata is greater than or equal to an MCS threshold (MCSth), the MCS order of predata is fixed as MCS (0)-(MCSth-1). For example, when the MCSth is 8, and the MCS order of the symbol of postdata is 8, 9, 10, 11, 12, or 13, the MCS order of the symbol of predata is 7.

The network device mainly encodes user data based on the MCS, and fills the user data in the at least one symbol.

Specifically, with reference to the MCS of the symbol of the data field provided in the example 1, the example 2, or the example 3 in step S101, a process of coding the user data is described as follows:

As described above, a coding scheme of the user data may be BCC coding or LDPC coding.

In an example 4, the BCC coding scheme is used as an example. Based on the Wi-Fi frame format provided in this embodiment of this disclosure, a TX_TIME calculation process is as follows (Formula 1).

$$TX\_TIME = 20 + T_{HE\_PREAMBLE} + (N_{SYM} - N_{predata}) \times T_{postdata} + N_{predata} \times T_{predata} + T_{PE} + \text{signalExtension} \quad \text{(Formula 1)};$$

TX_TIME is transmit duration of the Wi-Fi frame, and 20 includes quantities of bytes of L-STF, L-LTF, and L-SIG fields; $T_{HE\text{-}PREAMBLE} = T_{RL\text{-}SIG} + T_{HE\text{-}SIGA} + T_{HE\text{-}STF} + N_{HE\text{-}LTF} T_{HE\text{-}LTFSYM}$, $T_{HE\_PREAMBLE}$ is a symbol period of the first preamble field, $T_{predata}$ is a symbol period of first $N_{predata}$ symbols, and $T_{postdata}$ is a symbol period of last $(N_{SYM} - N_{predata})$ symbols; and $N_{SYM}$ is a quantity of symbols in the data field, $T_{PE}$ is data packet extension time of the data field, signalExtension is signal extension time, $T_{HE\text{-}LTFSYM}$ is a period length of an HE-LTF field, $N_{HE\text{-}LTF}$ is a quantity of symbols of the HE-LTF field, $T_{RL\text{-}SIG}$ is a period length of an RL-SIG field, $T_{HE\text{-}SIGA}$ is a period length of an HE-SIGA field, and $T_{HE\text{-}STF}$ is a period length of an HE-STF field. In the example 4, a subcarrier spacing of the first $N_{predata}$ symbols may be the same as a subcarrier spacing of the last $(N_{SYM} - N_{predata})$ symbols, that is, $T_{predata}$ is the same as $T_{postdata}$, which complies with an 802.11ax protocol.

Figure 11:
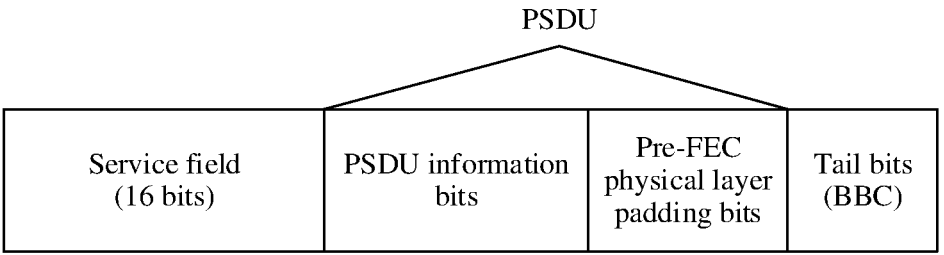
FIG. 11 is a schematic diagram of a structure of a data field according to an embodiment of this disclosure.

When the coding scheme is the BCC coding, as shown in FIG. 11, the data field includes a service field (usually 16 bits), PSDU information bits (PSDU Length), pre-FEC PHY padding bits, and tail bits (usually, the BCC coding scheme has the tail bits, and the LDPC coding scheme does not have the tail bits). For the Wi-Fi frame, the BCC coding is used as an example, and a calculation process of an encoded bit is as follows:

S1: Calculate a quantity of data bits $N_{Excess}$ of a last symbol of the data field.

In the Wi-Fi frame, a limited quantity of symbols of a sent data field needs to be at least greater than or equal to $N_{predata}$ symbols; and $N_{Excess}$ is the quantity of the data bits that can be carried by the last symbol of the data field.

$N_{Excess} = \text{mod}(8 \times APEP\_LENGTH + N_{Tail} + N_{service} - N_{DBPS0} \times N_{predata}, N_{DBPS1})$ (Formula 2), where $N_{DBPS1} = N_{sd} \times N_{BPSCS1} \times R_1$, and $N_{DBPS0} = N_{sd} \times N_{BPSCS0} \times R_0$. $R_1$ is a coding bit rate of the symbol of postdata, and $R_0$ is a coding bit rate of the symbol of predata; $N_{BPSCS1}$ is a quantity of encoded bits on each subcarrier on the symbol of postdata, $N_{BPSCS0}$ is a quantity of encoded bits on each subcarrier on the symbol of predata, $N_{sd}$ is a quantity of valid data subcarriers on one symbol, and the foregoing parameters comply with the 802.11ax protocol; and $N_{DBPS1}$ is a quantity of data bits of the symbol of postdata, and $N_{DBPS0}$ is a quantity of data bits of the symbol of predata. APEP_LENGTH is a length of a data packet carried in the data field, in bytes; and $N_{service}$ is a bit quantity of the service field, and $N_{Tail}$ is a bit quantity of the tail bits.

$N_{BPSCS1}$, $N_{BPSCS0}$, $R_1$, and $R_0$ may be obtained by looking up a table or by calculation based on MCS parameters. For example, if the HE-SIGA indicates that the MCS of the symbol of postdata is 12, and the HE-SIGA indicates that the MCS of the symbol of predata is two orders lower than the MCS of the another symbol, that is, the MCS of the symbol of predata is 10, $R_1 = \frac{3}{4}$, and $N_{BPSCS1} = 12$; and $R_0 = \frac{3}{4}$, and $N_{BPSCS0} = 10$ may be obtained by looking up a table (Table 5) based on the following MCS parameters.

TABLE 5

| MCS order (or index value) | Modulation scheme | R | $N_{BPSCS}$ | $N_{sd}$ | $N_{CBPS}$ | $N_{DBPS}$ | Data rate (data rate Mb/s) | | |
|---|---|---|---|---|---|---|---|---|---|
| | | | | | | | 0.8 μs GI | 1.6 μs GI | 3.2 μs GI |
| 0 | BPSK | 1/2 | 1 | 1960 | 15680 | 7840.00 | 576.4706 | 544.4444 | 490 |
| 1 | QPSK | 1/2 | 2 | 1960 | 31360 | 15680.00 | 1152.941 | 1088.889 | 980 |
| 2 | | 3/4 | 2 | 1960 | 31360 | 23520.00 | 1729.412 | 1633.333 | 1470 |
| 3 | 16 QAM | 1/2 | 4 | 1960 | 62720 | 31360.00 | 2305.882 | 2177.778 | 1960 |
| 4 | | 3/4 | 4 | 1960 | 62720 | 47040.00 | 3458.824 | 3266.667 | 2940 |
| 5 | 64 QAM | 2/3 | 6 | 1960 | 94080 | 62720.00 | 4611.765 | 4355.556 | 3920 |
| 6 | | 3/4 | 6 | 1960 | 94080 | 70560.00 | 5188.235 | 4900 | 4410 |
| 7 | | 5/6 | 6 | 1960 | 94080 | 78400.00 | 5764.706 | 5444.444 | 4900 |
| 8 | 256 QAM | 3/4 | 8 | 1960 | 125440 | 94080.00 | 6917.647 | 6533.333 | 5880 |
| 9 | | 5/6 | 8 | 1960 | 125440 | 104533.00 | 7686.275 | 7259.259 | 6533.333 |
| 10 | 1024 QAM | 3/4 | 10 | 1960 | 156800 | 117600.00 | 8647.059 | 8166.667 | 7350 |
| 11 | | 5/6 | 10 | 1960 | 156800 | 130666.67 | 9607.843 | 9074.074 | 8166.667 |
| 12 | 4096 QAM | 3/4 | 12 | 1960 | 188160 | 141120.00 | 10376.47 | 9800 | 8820 |
| 13 | | 5/6 | 12 | 1960 | 188160 | 156800.00 | 11529.41 | 10888.89 | 9800 |

Table 5 is a mapping relationship between an MCS index value and a parameter in an RU996*2 and eight spatial streams (Nss) in a bandwidth of 160 MHz. The modulation scheme includes binary phase shift keying (BPSK), quadrature phase shift keying (QPSK), 16 quadrature amplitude modulation (QAM), 64QAM, 256QAM, 1024QAM, and 4096QAM.

S2: Calculate a quantity $N_{SYM, init}$ of symbols of predata.

$$N_{SYM,init} =$$

$$\left( \left\lceil \frac{8 \times APEP\_LENGTH + N_{tail} + N_{service} - N_{DBPS0} \times N_{predata}}{N_{DBPS1}} \right\rceil + N_{predata} \right)$$

(Formula 3). $N_{Predata} \in [1\sim8]$, $N_{Tail}$ is the bit quantity of the tail bits, and $N_{service}$ is the bit quantity of the service field.

S3: Calculate a factor $a_{init}$ of the pre-FEC PHY padding.

Based on $N_{Excess}$, calculation of an initial $a_{init}$ of the pre-FEC PHY padding is as follows (Formula 4).

$$a_{init} = \begin{cases} 4, \text{ if } (N_{Excess} = 0) \\ \min\left(\left\lceil \frac{N_{Excess}}{N_{DBPS1,SHORT}} \right\rceil, 4\right), \text{ otherwise} \end{cases}$$ (Formula 4)

$$N_{DBPS1,SHORT} = N_{CBPS1,SHORT} \times R_1,$$

and $N_{CBPS1,SHORT} = N_{SD,SHORT} \times N_{ss} \times N_{BPSCS1} \times R_1$. $N_{SD,SHORT}$ is a quantity of data subcarriers of $a_{init}$ code elements before the last symbol of the data field; $N_{ss}$ is a quantity of spatial streams; and $N_{DBPS1,SHORT}$ is a quantity of data bits of a quarter of code elements of the last symbol.

A table of relationships between $N_{SD,SHORT}$ and a size of RU is shown in Table 6.

TABLE 6

| RU_size | $N_{SD, SHORT}$ |
|---|---|
| 242-tone | 60 |
| 484-tone | 120 |
| 996-tone | 240 |
| 2 × 996-tone | 492 |

S4: Calculate the quantity of the data bits and a quantity of encoded bits that are carried in the last symbol of the data field.

The quantity of the data bits carried in the last symbol of the data field is:

$$N_{DBPS,LAST,init} = \begin{cases} a_{init} \times N_{DBPS,SHORT}, \text{ if } (a_{init} < 4) \\ N_{DBPS}, \text{ if } (a_{init} = 4) \end{cases}$$ (Formula 5)

The quantity of the encoded bits of the last symbol of the data field is:

$$N_{CBPS,LAST,init} = \begin{cases} a_{init} \times N_{CBPS,SHORT}, \text{ if } (a_{init} < 4) \\ N_{CBPS}, \text{ if } (a_{init} = 4) \end{cases}$$ (Formula 6)

$N_{CBPS,SHORT}$ is a quantity of encoded bits of a quarter of code elements of the last symbol.

S5: Calculate a bit quantity $N_{PAD,Pre-FEC}$ of the pre-FEC PHY padding.

$$N_{PAD,Pre-FEC} =$$ (Formula 7)

$$(N_{SYM,init} - 1 - N_{Predata}) \times N_{DBPS1} + N_{predata} \times N_{DBPS0} +$$

$$N_{DBPS,last,init} - 8 \times APEP\_LENGTH - N_{tail} - N_{service}.$$

S6: Perform BCC coding.

$N_{SYM} = N_{SYM,init}$, and $a = a_{init}$. A quantity of data bits of a last data symbol of the data field is $N_{DBPS1,last} = N_{DBPS1,last,init}$; and a quantity of encoded bits of the last data symbol of the data field is $N_{CBPS1,last} = N_{CBPS1,last,init}$.

S7: Calculate post-FEC PHY padding.

After the last symbol of the data field is encoded, post-FEC PHY padding bits are padded, and a bit quantity $N_{PAD,post-FEC}$ of the post-FEC PHY padding of the last data symbol of the data field is calculated according to Formula 8: $N_{PAD,post-FEC} = N_{CBPS1} - N_{CBPS1,last}$ (Formula 8).

The last symbol includes $N_{CBPS1,last}$ bits and $N_{PAD,post-FEC}$ post-FEC PHY padding bits. The post-FEC PHY padding is a quantity of data bits corresponding to $a_{init}$ (values of $a_{init}$: 1, 2, 3, and 4).

For other processing such as scrambling code, constellation point mapping, IFFT, CSD, refer to the 802.11ax protocol, and there is no change.

In the foregoing example 4, the same subcarrier spacing is used between the subcarrier of the symbol of predata and the subcarrier of the symbol of postdata. In some examples, the subcarrier of the symbol of predata may use a larger subcarrier spacing and a smaller symbol spacing than the subcarrier of the symbol of postdata. When the subcarrier spacing is larger, a frequency offset resistance capability can be improved. When the symbol of predata uses the lower MCS order and the larger subcarrier spacing, requirements on the signal-to-noise ratio of the channel estimation and a frequency offset correction capability are lower, a probability of incorrectly demodulating the symbol of predata is reduced, and a probability of incorrectly demodulating scrambling code is reduced. In addition, when there is a high probability that predata is correctly demodulated, predata can be used to enhance the channel estimation and phase estimation, and improve a subsequent data demodulation capability. In this way, (in Formula 1) $T_{predata}$ is different from $T_{postdata}$, the large subcarrier spacing is selected for the symbol of predata, and the symbol period is shorter. As shown in Table 7, a mapping relationship between the subcarrier spacing of predata and the subcarrier spacing of postdata is provided, and others comply with the 802.11ax protocol.

TABLE 7

| Subcarrier spacing predata | $T_{predata}$/(us) | Subcarrier spacing postdata | $T_{postdata}$/(us) |
|---|---|---|---|
| 312.5 kHz | 3.2 + GI | 78.125 kHz | 12.8 + GI |
| 156.25 kHz | 6.4 + GI | 78.125 kHz | 12.8 + GI |
| 78.125 kHz | 12.8 + GI | 78.125 kHz | 12.8 + GI |

For a guard interval (GI) length, refer to the 802.11ax protocol. 3.2 us, 1.6 us, 0.8 us, or the like correspond to different GI lengths indicated by the HE-SIGA.

Figure 12:
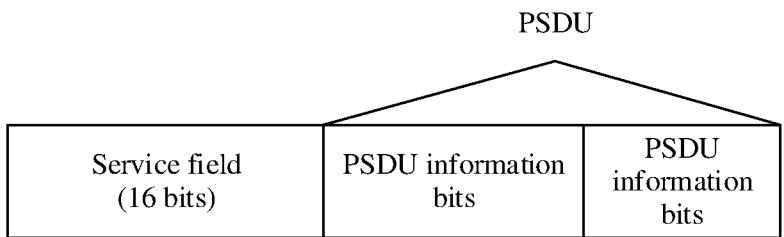
FIG. 12 is a schematic diagram of a structure of a data field according to another embodiment of this disclosure.

In an example 5, when the coding scheme is the LDPC coding, as shown in FIG. 12, the data field includes a service field (usually 16 bits), PSDU information bits (PSDU Length), and pre-FEC PHY padding bits. For the Wi-Fi frame, the LDPC coding is used as an example, and a calculation process of an encoded bit of the symbol is as follows:

S1: Calculate a quantity $N_{Excess}$ of data bits of a last symbol of the data field.

In the Wi-Fi frame, a limited quantity of symbols of a sent data field needs to be at least greater than $N_{predata}$ symbols; and $N_{Excess}$ is the quantity of the data bits that can be carried by the last symbol of the data field.

$N_{Excess}$=mod($8 \times$APEP_LENGTH+$N_{Tail}$+$N_{service}$−$N_{DBPS0} \times N_{predata,\ init}$, $N_{DBPS1}$), where $N_{DBPS1}$=$N_{sd1} \times N_{BPSCS1} \times R_1$, and $N_{DBPS0}$=$N_{sd0} \times N_{BPSCS0} \times R_0$. $R_1$ is a coding bit rate of the symbol of postdata, and $R_0$ is a coding bit rate of the symbol of predata; $N_{BPSCS1}$ is a quantity of encoded bits on each subcarrier of postdata, $N_{BPSCS0}$ is a quantity of encoded bits on each subcarrier of predata, $N_{sd1}$ is a quantity of valid data subcarriers of the symbol of postdata, and $N_{sd0}$ is a quantity of valid data subcarriers of the symbol of predata; $N_{DBPS1}$ is a quantity of data bits of the symbol of postdata, and $N_{DBPS0}$ is a quantity of data bits of the symbol of predata; and APEP_LENGTH is a length of a data packet, in bytes; and $N_{service}$ is a bit quantity of the service field; $N_{BPSCS1}$, $N_{BPSCS0}$, $R_1$, and $R_0$ may be obtained by looking up a table or by calculation based on MCS parameters. For example, if the MCS of the data symbol of postdata indicated by the HE-SIGA is 12, the MCS of the symbol of predata indicated by the HE-SIGA is fixed at 7, and $R_1$=¾ $N_{BPSCS1}$=12; and $R_0$=⅚ $N_{BPSCS0}$=6 are obtained by looking up the table (Table 5) based on the MCS parameters.

S2: Calculate a quantity $N_{SYM,init}$ of symbols of predata.

$$N_{SYM,init} = \left( \left\lceil \frac{8 \times \text{APEP\_LENGTH} + N_{service} - N_{DBPS0} \times N_{predata,init}}{N_{DBPS1}} \right\rceil + N_{predata,init} \right).$$

S3: Calculate a factor $a_{init}$ of the pre-FEC PHY padding. Based on $N_{Excess}$ calculation of $a_{init}$ of the pre-FEC PHY padding is as follows:

$$a_{init} = \begin{cases} 4, \text{ if } (N_{Excess} = 0) \\ \min\left(\left\lceil \frac{N_{Excess}}{N_{DBPS1,SHORT}} \right\rceil, 4\right), \text{ otherwise} \end{cases}.$$

$N_{DBPS1,SHORT}$=$N_{CBPS1,SHORT} \times R_1$, and $N_{CRPS1,\ SHORT}$=$N_{SD,SHORT} \times N_{ss} \times N_{BPSCS1} \times R_1$. $N_{SD,SHORT}$ is a quantity of data subcarriers of $a_{init}$ code elements before the last symbol.

S4: Calculate the quantity of the data bits and a quantity of encoded bits that are carried in the last symbol of the data field.

$$N_{DBPS,LAST,init} = \begin{cases} a_{init} \times N_{DBPS,SHORT}, \text{ if } (a_{init} < 4) \\ N_{DBPS}, \text{ if } (a_{init} = 4) \end{cases}; \text{ and}$$

$$N_{CBPS,LAST,init} = \begin{cases} a_{init} \times N_{CBPS,SHORT}, \text{ if } (a_{init} < 4) \\ N_{CBPS}, \text{ if } (a_{init} = 4) \end{cases}.$$

A quantity $N_{pld}$ of data bits of the data field in the LDPC coding is calculated, and $N_{pld}$=($N_{SYM,init}$−1−$N_{predata,\ init}$)$\times N_{DRPS1}$+$N_{predata} \times N_{DBPS0}$+$N_{DBPS,LAST,init}$. A quantity of data bits of the symbol of predata in the LDPC coding is: $N_{pld0}$=$N_{predata,\ init} \times N_{DBPS0}$; and a quantity of data bits of the symbol of postdata in the LDPC coding is $N_{pld1}$=$N_{pld}$−$N_{pld0}$.

A quantity $N_{avbits}$ of encoded bits of the data field in the LDPC coding is calculated, and $N_{avbits}$=($N_{SYM,init}$−1−$N_{predata,\ init}$)$\times N_{CBPS1}$+$N_{predata} \times N_{CBPS0}$+$N_{CBPS,LAST,init}$. A quantity of encoded bits of the symbol of predata in the LDPC coding is $N_{avbit0}$=$N_{predata,\ init} \times N_{CBPS0}$; and a quantity of encoded bits of the symbol of postdata in the LDPC coding is $N_{avbits1}$=($N_{SYM,init}$−1−$N_{predata,\ init}$)$\times N_{CBPS1}$+$N_{CBPS,LAST,init}$.

In the LDPC coding scheme, the symbol of predata and the symbol of postdata are separately encoded, and calculation of a code block and a code length of the symbol of predata is shown in Table 8.

TABLE 8

| Range of the quantity of the encoded bits of the symbol of predata in the LDPC coding | Quantity $N_{CW0}$ of code blocks of the symbol of predata in the LDPC coding | Code length $L_{LDPC0}$ of the symbol of predata in the LDPC coding |
|---|---|---|
| $N_{avbit0}$ <= 648 | 1 | if ($N_{avbit0}$ >= $N_{pld0}$ + 912 × (1 − $R_0$)) $L_{LDPC0}$ = 1296 else $L_{LDPC0}$ = 648 |
| 648 < $N_{avbit0}$ <= 1296 | 1 | if ($N_{avbit0}$ >= $N_{pld0}$ + 1464 × (1 − $R_0$)) $L_{LDPC0}$ = 1944 else $L_{LDPC0}$ = 1296 |

TABLE 8-continued

| Range of the quantity of the encoded bits of the symbol of predata in the LDPC coding | Quantity $N_{CW0}$ of code blocks of the symbol of predata in the LDPC coding | Code length $L_{LDPC0}$ of the symbol of predata in the LDPC coding |
|---|---|---|
| $1296 < N_{avbit0} <= 1944$ | 1 | 1944 |
| $1944 < N_{avbit0} <= 2592$ | 2 | if $(N_{avbit0} >= N_{pld0} + 2916 \times (1 - R_0))$ $\quad L_{LDPC0} = 1944$ else $\quad L_{LDPC0} = 1296$ |
| $2592 < N_{avbit0}$ | $\left\lceil \dfrac{N_{pld0}}{1944 \times R_0} \right\rceil$ | 1944 |

Calculation of a code block and a code length of the symbol of postdata is shown in Table 9.

TABLE 9

| Range of the quantity of the encoded bits of the symbol of postdata in the LDPC coding | Quantity $N_{CW1}$ of code blocks of the symbol of postdata in the LDPC coding | Code length $L_{LDPC1}$ of the symbol of postdata in the LDPC coding |
|---|---|---|
| $N_{avbit1} <= 648$ | 1 | if $(N_{avbit1} >= N_{pld} - N_{pld0} + 912 \times (1 - R_1))$ $\quad L_{LDPC1} = 1296$ else $\quad L_{LDPC1} = 648$ |
| $648 < N_{avbit1} <= 1296$ | 1 | if $(N_{avbit1} >= N_{pld} - N_{pld0} + 1464 \times (1 - R_1))$ $\quad L_{LDPC1} = 1944$ else $\quad L_{LDPC1} = 1296$ |
| $1296 < N_{avbit1} <= 1944$ | 1 | 1944 |
| $1944 < N_{avbit1} <= 2592$ | 2 | if $(N_{avbit1} >= N_{pld} - N_{pld0} + 2916 \times (1 - R_1))$ $\quad L_{LDPC1} = 1944$ else $\quad L_{LDPC1} = 1296$ |
| $2592 < N_{avbit1}$ | $\left\lceil \dfrac{N_{pld} - N_{pld0}}{1944 \times R_1} \right\rceil$ | 1944 |

A shortened bit of predate is represented by $N_{shrt0}=\max(0, (N_{CW0}-1) \times L_{LDPC0} \times R_0 - N_{pld0})$; A shortened bit of postdata is represented by $N_{shrt1}=\max(0, (N_{CW1}-1) \times L_{LDPC1} \times R_1 - (N_{pld} - N_{pld0}))$; a punctured bit of predata is represented by $N_{punc0}=\max(0, N_{CW1} \times L_{LDPC0} - N_{avbit0} - N_{shrt0})$; and a punctured bit of postdata is represented by $N_{punc1}=\max(0, N_{CW1} \times L_{LDPC1} - N_{avbits1} - N_{shrt1})$.

Refer to the 802.11ax protocol. In the LDPC coding, whether LDPC_extra_symbol_flag of predata is 1 needs to be determined, and a field needs to be added to indicate an extra symbol of Npredata in LDPC. For calculation of the extra symbol, refer to an LDPC calculation process, refer to an 802.11n/802.11ac/802.11ax protocol, and details are not described herein. In this case, $N_{predata}=N_{predata,init}+1$.

LDPC_extra_symbol_flag is determined as follows:

$$\text{if}\Big( (N_{punc1} > 0.1 \times [N_{CW1} \times L_{LDPC1} \times (1 - R_1)])$$

$$\text{And}\Big( N_{shrt1} < 1.2 \times \Big( N_{punc1} \times \frac{R_1}{1 - R_1} \Big) \Big) >= 1 \Big) \text{ Or}$$

-continued $$\text{if}((N_{punc} > 0.3 \times [N_{CW1} \times L_{LDPC1} \times (1 - R_1)]);$$

$$\text{LDPC\_extra\_symbol\_flag} = 1.$$

When LDPC_extra_symbol_flag is 1, $N_{avbits}$ needs to be added to:

$$N_{avbits} = \begin{cases} N_{avbits0} + N_{avbits1} + N_{CBPS1} - 3 \times N_{CBPS1,short} & \text{if}(a_{init} = 3) \\ N_{avbits0} + N_{avbits1} + N_{CBPS1,short}, & \text{otherwise} \end{cases}.$$

The quantity of the symbols and a factor a of the data field are updated to:

$$\text{if}(a_{init} = 4)\{N_{sym} = N_{sym\_init} + 1 a = 1\}$$

$$\text{else}\{N_{sym} = N_{sym\_init} a = a_{init} + 1\}$$

The quantity of the data bits and the quantity of the encoded bits of the last symbol are:

$$N_{DBPS1,LAST} = \begin{cases} a \times N_{DBPS1,SHORT}, & \text{if } (a < 4) \\ N_{DBPS1}, & \text{if } (a_{init} = 4) \end{cases}; \text{ and}$$

$$N_{CBPS1,LAST} = \begin{cases} a \times N_{CBPS1,SHORT}, & \text{if } (a < 4) \\ N_{CBPS1}, & \text{if } (a = 4) \end{cases}.$$

When LDPC_extra_symbol_flag is 0, the quantity of the symbols and the factor a of the data field are:

$$N_{SYM}=N_{SYM,init}, a=a_{init}.$$

The quantity of the data bits and the quantity of the encoded bits of the last symbol are: $N_{DBPS1,last}=N_{DBPS1,last,init}, N_{CBPS1,last}=N_{CBPS1,last,init}.$ S5: Calculate the post-FEC PHY padding.

After the last symbol is encoded, the post-FEC PHY padding is performed, and the post-FEC PHY padding is calculated as follows: $N_{PAD,post-FEC}=N_{CBPS1}-N_{CBPS1,last}.$ The last symbol includes $N_{CBPS1,last}$ bits and $N_{PAD,post-FEC}$ bits of the post-FEC PHY padding.

S102: The network device transmits the Wi-Fi frame to the terminal device.

S103: The terminal device receives the Wi-Fi frame transmitted by the network device.

S104: The terminal device determines, based on the first preamble field in the Wi-Fi frame, a modulation and coding scheme MCS of at least one symbol in a data field in the Wi-Fi frame transmitted by a first communication apparatus.

S105: The terminal device demodulates the at least one symbol based on the MCS.

For a process in which the terminal device demodulates the at least one symbol based on the MCS, and obtains user data carried in the at least one symbol, refer to FIG. 4. The terminal device performs the processing such as the demapping, the de-interleaving, and the stream parsing on the symbol of predata in the Wi-Fi frame based on the MCS of predata. The terminal device performs the processing such as the demapping, the de-interleaving, and the stream parsing on the symbol of postdata in the Wi-Fi frame based on the MCS of postdata.

In the foregoing solution, the MCS of the first few symbols in the data field in the Wi-Fi frame is mainly reduced, that is, compared with the another symbol after the first few symbols, the first few symbols are encoded by using the lower MCS order. In this way, a requirement on a demodulation capability of a receiver is lowered, a probability that the first few symbols are correctly demodulated is increased, and further, demodulation performance of another symbol for which high-order MCS coding is used is improved.

An embodiment of this disclosure provides a communication method for a wireless fidelity (Wi-Fi) system. An example in which a network device transmits a Wi-Fi frame to a terminal device is used for description. The communication method for the wireless fidelity (Wi-Fi) system includes step S201 to step S209.

S201: A network device generates a Wi-Fi frame including a first preamble field.

Figure 13:
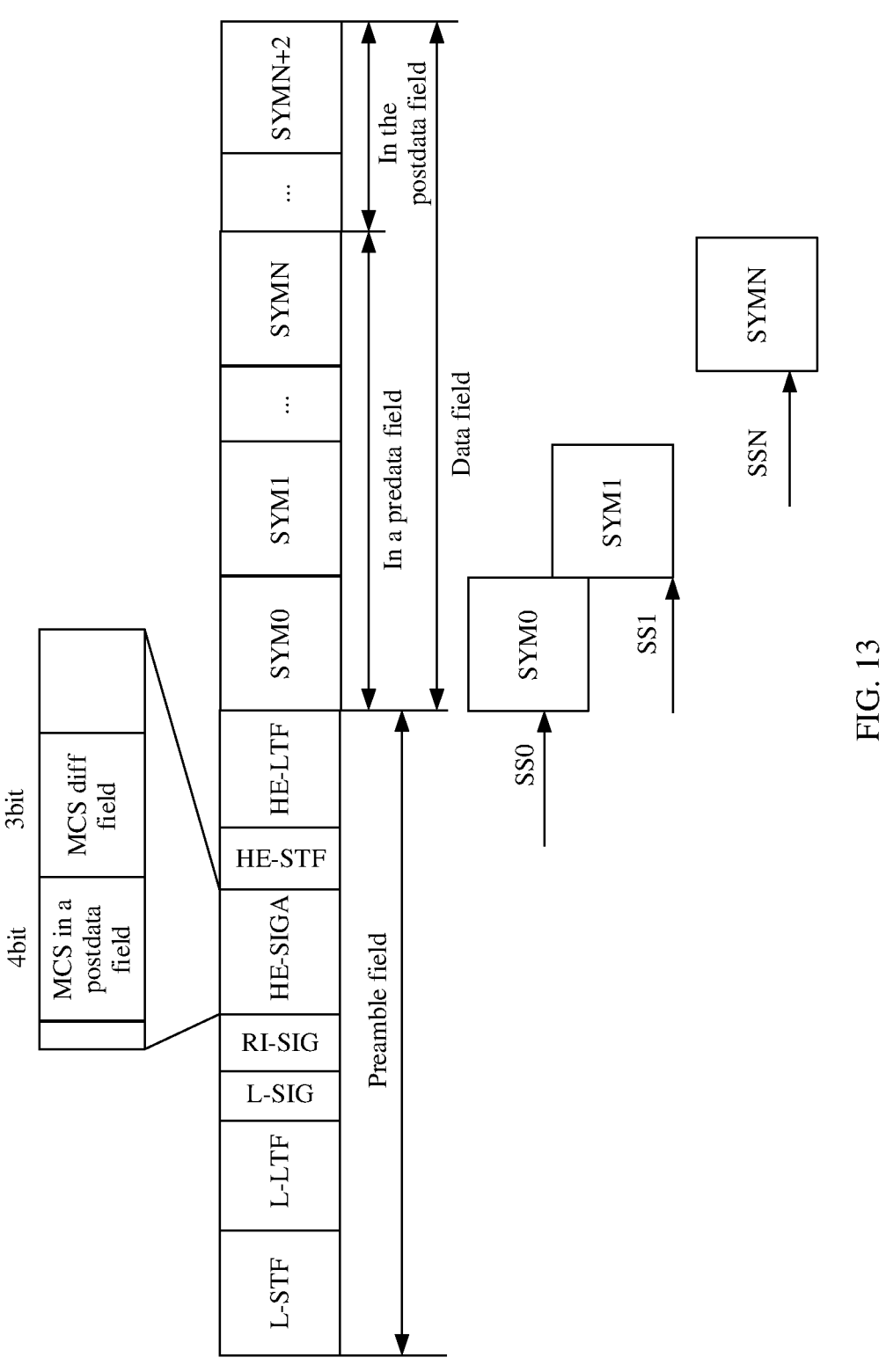
FIG. 13 is a schematic diagram of a structure of a Wi-Fi frame according to yet another embodiment of this disclosure.
Figure 14:
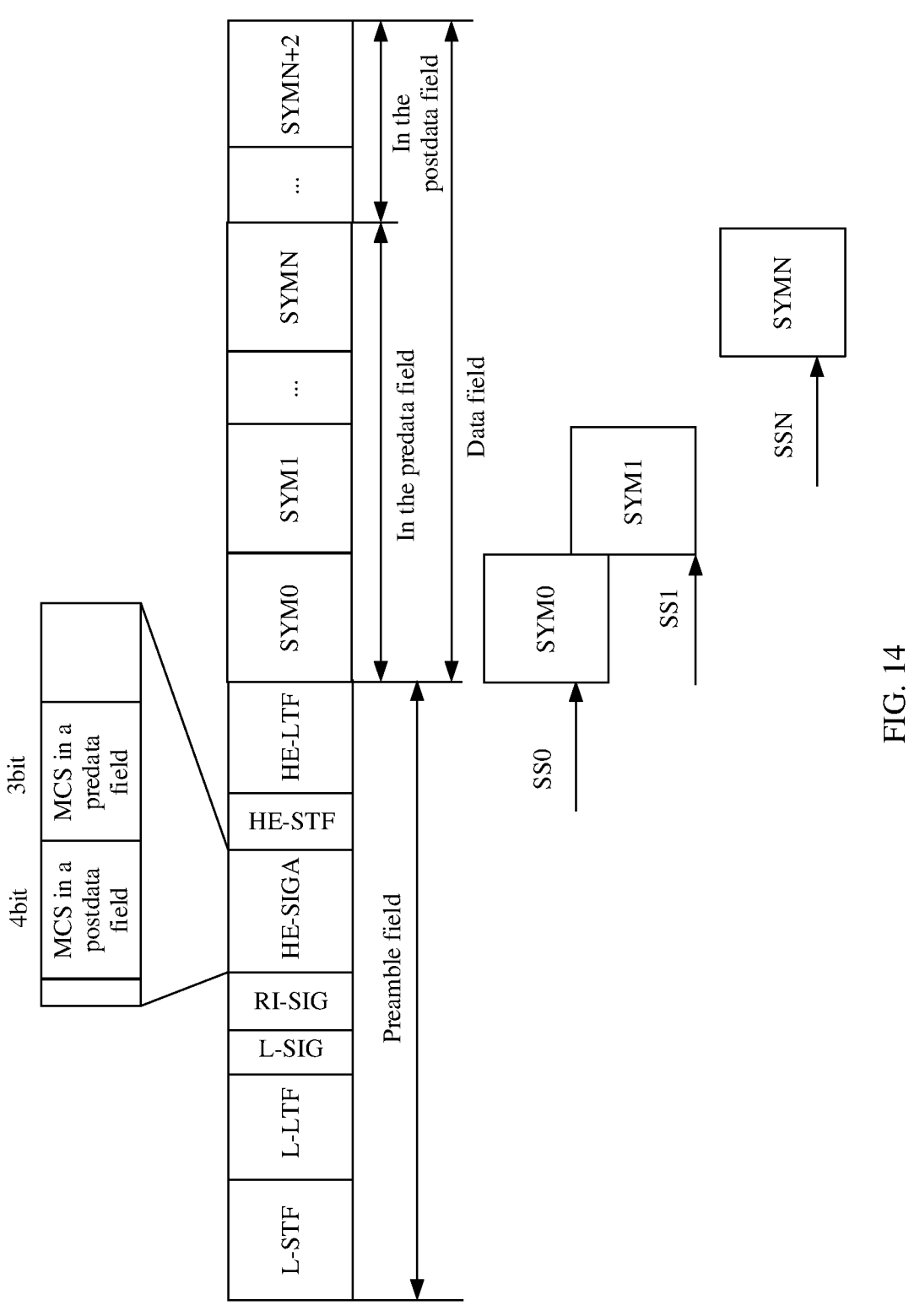
FIG. 14 is a schematic diagram of a structure of a Wi-Fi frame according to another embodiment of this disclosure.

The first preamble field indicates a modulation and coding scheme MCS of at least one symbol in a data field in the Wi-Fi frame, an MCS order of first m symbols in the at least one symbol is less than an MCS order of another symbol, and m is a positive integer greater than or equal to 1. As shown in FIG. 13, a Wi-Fi frame structure is provided. A first high efficient-signal field HE-SIGA of the first preamble field includes an MCS postdata field (indicating the MCS order in a postdata field (postdata, which refers to the another symbol), as shown in Table 1), and an MCS diff field (indicating a difference between the MCS order in a predata field (predata, which refers to the first m symbols) and the MCS order in the postdata field, as shown in Table 2, and in this embodiment of this disclosure, indicating the order by which MCS predata is lower than MCS postdata). Alternatively, as shown in FIG. 14, the HE-SIGA of the first preamble field includes an MCS postdata field (the MCS in a postdata field, which refers to the MCS order of the another symbol, as shown in Table 1), and an MCS predata field (the MCS order in a predata field (predata, which refers to the first m symbols), as shown in Table 4). The first high efficient-signal field HE-SIGA includes a quantity of spatial streams of user data; and m=k*Nss, Nss is the quantity of the spatial streams, and k is a positive integer greater than or equal to 1. In this way, the network device determines a value of m based on the quantity of the spatial streams of the user data.

After the network device encodes the user data stream based on the MCS, and fills the user data stream in the at least one symbol, as shown in FIG. 13 and FIG. 14, each of the first m symbols carries one spatial stream of the user data. For example, a symbol 0 sends a first spatial stream, a symbol 1 sends a second spatial stream, and a symbol N sends an $Nss^{th}$ spatial stream. When the quantity of the spatial streams is small, Nss spatial streams may alternatively be cyclically sent in the first m symbols. For example, the symbol 0 sends a first spatial stream, and the symbol 1 sends a second spatial stream. For example, the symbol 2 sends the first spatial stream, the symbol 3 sends the second spatial stream . . . , and for a coding process, refer to the specific descriptions in the foregoing embodiments. Details are not described again.

S202: The network device transmits the Wi-Fi frame to the terminal device.

S203: The terminal device receives the Wi-Fi frame transmitted by the network device.

S204: The terminal device determines, based on the first preamble field in the Wi-Fi frame, a modulation and coding scheme MCS of at least one symbol in a data field in the Wi-Fi frame transmitted by a first communication apparatus.

S205: The terminal device demodulates the at least one symbol based on the MCS.

In this way, the terminal device receives only a single stream for the first m symbols in the data field in the Wi-Fi frame. The terminal device performs simple demodulation, has a low requirement on a time sequence, and has a strong capability of demodulating the single stream. In this way, when a high probability of correctly demodulating the first few symbols can be ensured, the first few symbols are used to perform channel estimation again and enhance channel estimation, to enhance a signal-to-noise ratio of the channel estimation of the terminal device. In addition, frequency offset and phase capabilities may be enhanced, to improve a demodulation capability of the terminal device.

An embodiment of this disclosure provides a communication method for a wireless fidelity (Wi-Fi) system. An example in which a network device transmits a Wi-Fi frame to a terminal device is used for description. The communication method for the wireless fidelity (Wi-Fi) system includes step S301 to step S308.

S301: A network device generates a Wi-Fi frame including a first preamble field.

Figure 15:
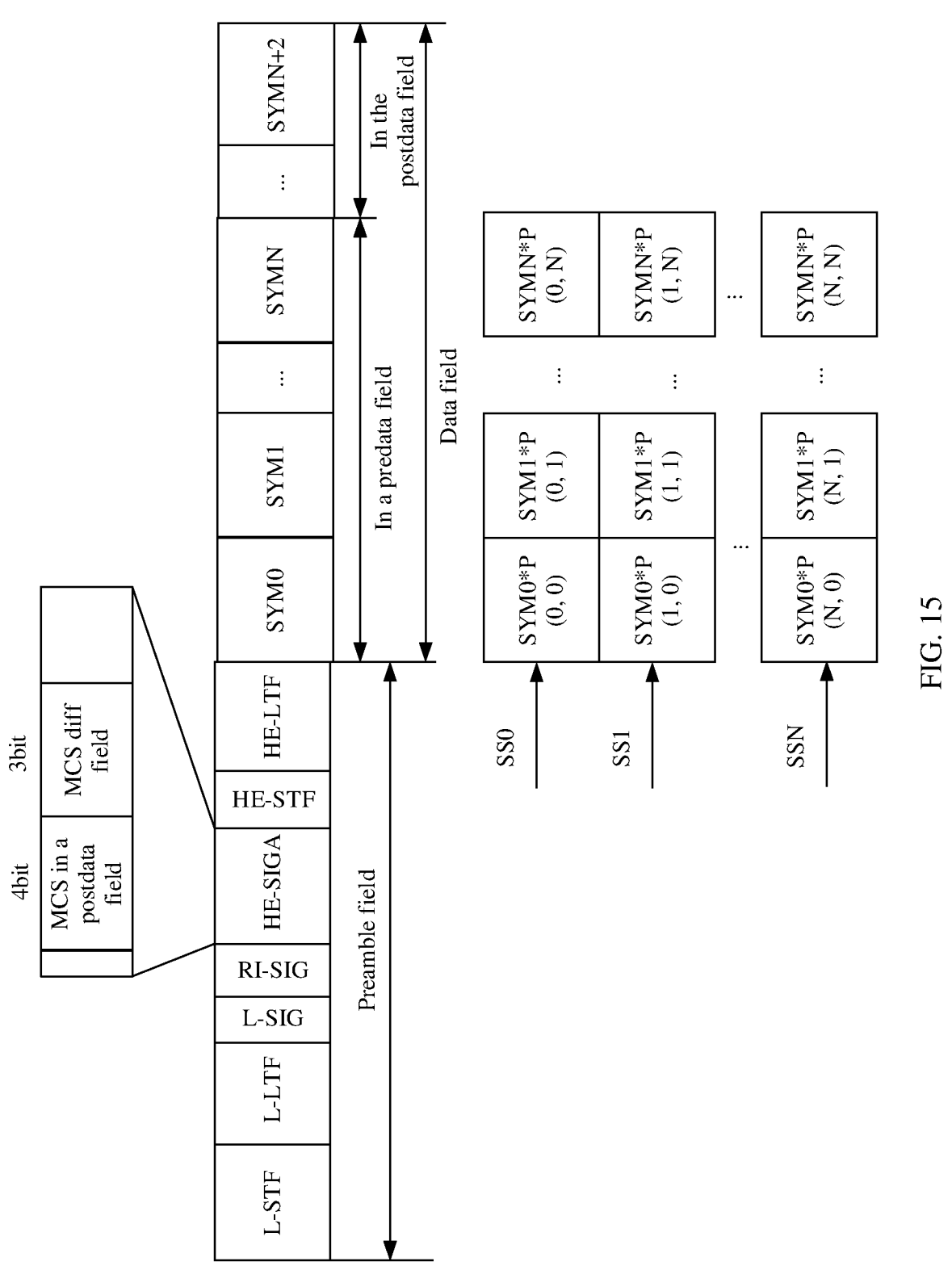
FIG. 15 is a schematic diagram of a structure of a Wi-Fi frame according to still another embodiment of this disclosure.
Figure 16:
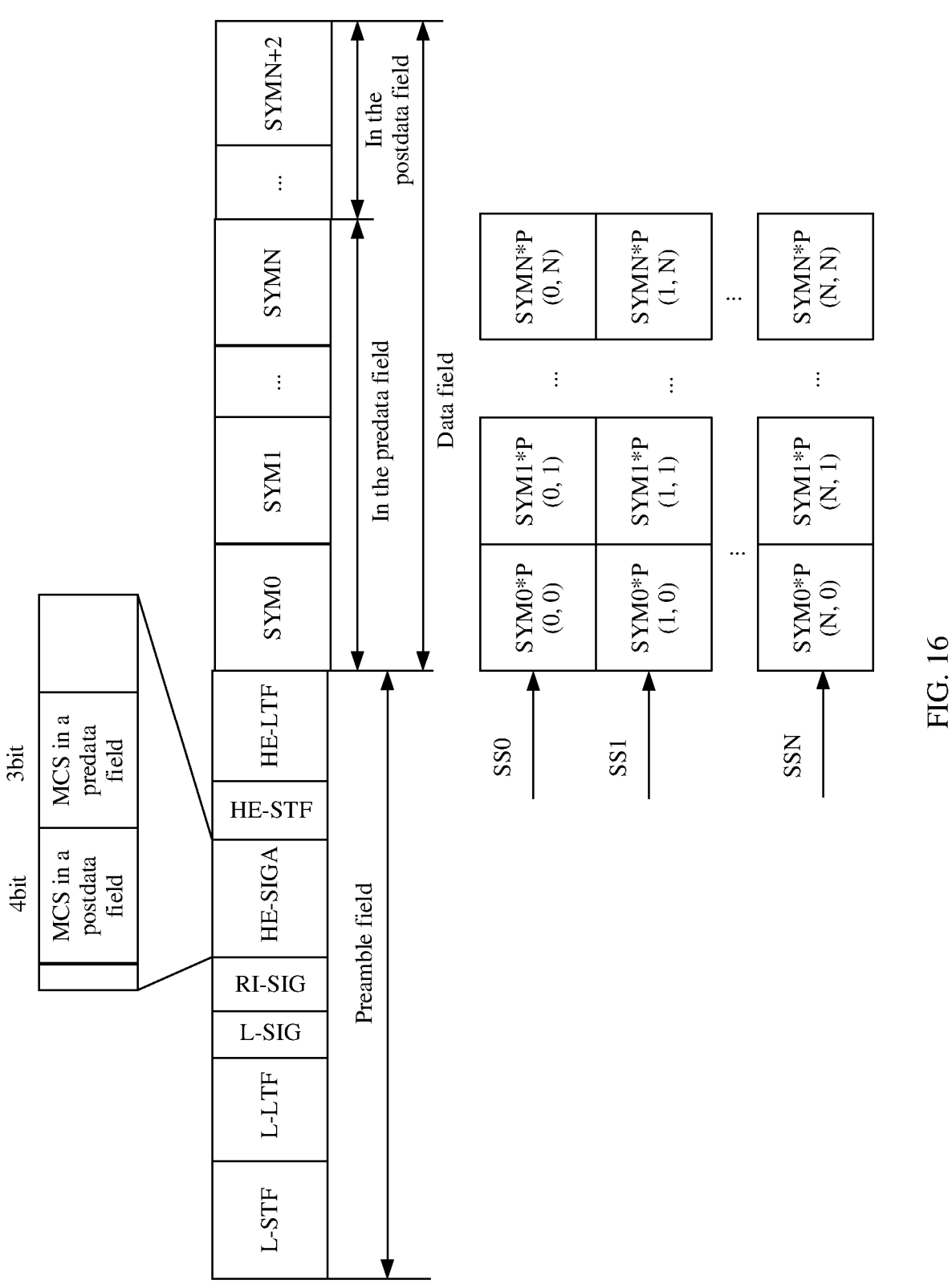
FIG. 16 is a schematic diagram of a structure of a Wi-Fi frame according to yet another embodiment of this disclosure.

The first preamble field indicates a modulation and coding scheme MCS of at least one symbol in a data field in the Wi-Fi frame, an MCS order of first m symbols in the at least one symbol is less than an MCS order of another symbol, and m is a positive integer greater than or equal to 1. As shown in FIG. 15, a Wi-Fi frame structure is provided. A first high efficient-signal field HE-SIGA of the first preamble field includes an MCS postdata field (indicating the MCS order in a postdata field (postdata, which refers to the another symbol), as shown in Table 1), and an MCS diff field (indicating a difference between the MCS order in a predata field (predata, which refers to the first m symbols) and the MCS order in the postdata field, as shown in Table 2, and in this embodiment of this disclosure, indicating the order by which MCS predata is lower than MCS postdata). Alternatively, as shown in FIG. 16, the HE-SIGA of the first preamble field includes an MCS postdata field (the MCS in a postdata field, which refers to the MCS order of the another symbol, as shown in Table 1), and an MCS predata field (the MCS order in a predata field (predata, which refers to the first m symbols), as shown in Table 4). The first preamble field further includes a high efficient-long training field HE-LTF; and m=S, and S is a quantity of symbols of the HE-LTF. In this way, the network device determines a value of m based on the quantity of the symbols of the high efficient-long training field HE-LTF.

Table 10 shows a relationship between a quantity $N_{ss}$ of spatial streams and a quantity $N_{HE-LTF}$ of symbols in the HE-LTF.

TABLE 10

| $N_{SS}$ | $N_{HE-LTF}$ |
|---|---|
| 1 | 1 |
| 2 | 2 |
| 3 | 4 |
| 4 | 4 |
| 5 | 6 |
| 6 | 6 |
| 7 | 8 |
| 8 | 8 |

After the network device encodes user data based on the MCS and fills the user data in the at least one symbol, as shown in FIG. 15 and FIG. 16, each of the first m symbols carries a plurality of spatial streams SS0 to SSN of the user data. A plurality of spatial streams of user data carried in the at least one symbol are weighted by using an orthogonal (perpendicular, P) matrix, where the orthogonal P matrix is an m*m orthogonal matrix. SSN is multiplied by an element P (i, j) of the orthogonal P matrix in each symbol, where $0 \leq i \leq N$, and $0 \leq j \leq N$.

The orthogonal P matrix is consistent with a P matrix of the HE-LTF in 802.11ax. For $$P_{2 \times 2} = \begin{bmatrix} 1 & -1 \\ 1 & 1 \end{bmatrix};$$

$$P_{4 \times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

$$P_{6 \times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}, \text{ where}$$

$$w = \exp\left(\frac{-j2\pi}{6}\right); \text{ and } P_{8 \times 8} = \begin{bmatrix} P_{4 \times 4} & P_{4 \times 4} \\ P_{4 \times 4} & -P_{4 \times 4} \end{bmatrix}.$$

For a coding process, refer to the foregoing embodiments, and details are not described again.

S302: The network device transmits the Wi-Fi frame to the terminal device.

S303: The terminal device receives the Wi-Fi frame transmitted by the network device.

S304: The terminal device determines, based on the first preamble field in the Wi-Fi frame, a modulation and coding scheme MCS of at least one symbol in a data field in the Wi-Fi frame transmitted by a first communication apparatus.

S305: The terminal device demodulates the at least one symbol based on the MCS.

In this way, the network device sends same data to the first m symbols in the data field in the Wi-Fi frame, and performs P-matrix weighting on different symbols and different streams. In this way, the terminal device can perform channel estimation again and enhance frequency offset estimation, to enhance a signal-to-noise ratio of the channel estimation of the terminal device, and improve a demodulation capability of the terminal device.

It may be understood that, to implement the foregoing functions, the network device and the terminal device include corresponding hardware structures and/or software modules for performing the functions. A person skilled in the art should be easily aware that, in combination with units and algorithm operations of the examples described in embodiments disclosed in this specification, this disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, functional modules of the network device may be obtained through division based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in embodiments of this disclosure, division into the modules is an example, is merely logical function division, and may be other division in an actual implementation.

Figure 17:
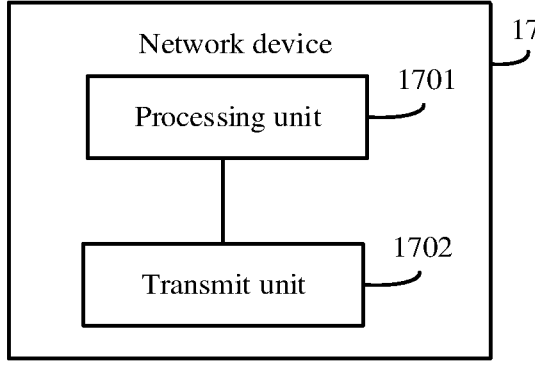
FIG. 17 is a schematic diagram of a structure of a network device according to an embodiment of this disclosure.

For example, when each functional module is obtained through division in an integrated manner, FIG. 17 is a schematic diagram of a structure of a communication apparatus. The communication apparatus may be a chip or a system-on-a-chip in the network device, or another combined component, another component, or the like that can implement a function of the network device. The communication apparatus may be configured to perform the function of the network device in the foregoing embodiments.

In a possible implementation, the communication apparatus shown in FIG. 17 includes a transmit unit 1702 and a processing unit 1701. The processing unit 1701 is configured to generate a Wi-Fi frame including a first preamble field. The first preamble field indicates a modulation and coding scheme MCS of at least one symbol in a data field in the Wi-Fi frame, an MCS order of first m symbols in the at least one symbol is less than an MCS order of another symbol, and m is a positive integer greater than or equal to 1. The transmit unit 1702 is configured to transmit the Wi-Fi frame.

Optionally, the first preamble field includes a first high efficient-signal field HE-SIGA; and the processing unit 1701 is further configured to: determine a value by which the MCS order of the first m symbols is lower than the MCS order of the another symbol; and include the value and the MCS order of the another symbol in the first high efficient-signal field HE-SIGA.

Optionally, the first preamble field includes the first high efficient-signal field HE-SIGA; and the processing unit 1701 is further configured to include, in the first high efficient-signal field HE-SIGA, a bit for indicating a value of m.

Optionally, the first preamble field includes a first high efficient-signal field HE-SIGA; and the processing unit 1701 is further configured to include an MCS order of the at least one symbol in the first high efficient-signal field HE-SIGA.

Optionally, the first preamble field includes a first high efficient-signal field HE-SIGA; and the processing unit 1701 is further configured to include the MCS order of the another symbol in the first high efficient-signal field HE-SIGA.

Optionally, the first preamble field includes the first high efficient-signal field HE-SIGA; the first high efficient-signal field HE-SIGA includes a quantity of spatial streams of user data; and m=k*Nss, Nss is the quantity of the spatial streams, and k is a positive integer greater than or equal to 1.

Optionally, the first preamble field includes a high efficient-long training field HE-LTF; and m=S, and S is a quantity of symbols of the HE-LTF.

Optionally, a subcarrier spacing of the first m symbols is greater than a subcarrier spacing of the another symbol.

All related content of the operations in the foregoing method embodiments may be cited in function descriptions of the corresponding functional modules. Details are not described herein again.

In this embodiment, the communication apparatus is presented in a form of the functional modules obtained through division in the integrated manner. The module herein may be a specific ASIC, a circuit, a processor that executes one or more software or firmware programs, a memory, an integrated logic circuit, and/or another component that can provide the foregoing functions. In a simple embodiment, a person skilled in the art may figure out that the communication apparatus may be in a form of the network device shown in FIG. 6.

For example, the processor 201 in FIG. 6 may invoke the computer-executable instructions stored in the memory 202, to enable the communication apparatus to perform the communication method for the wireless fidelity (Wi-Fi) system in embodiments of this disclosure.

For example, functions/implementation processes of the transmit unit 1702 and the processing unit 1701 in FIG. 17 may be implemented by the processor 201 in FIG. 6 by invoking the computer-executable instructions stored in the memory 202. Alternatively, the function/implementation process of the processing unit 1701 in FIG. 17 may be implemented by the processor 201 in FIG. 6 by invoking the computer-executable instructions stored in the memory 202, and the function/implementation process of the transmit unit 1702 in FIG. 17 may be implemented by using the transmitter in the transceiver 203 in FIG. 6.

Because the communication apparatus provided in this embodiment may execute the communication method for the wireless fidelity (Wi-Fi) system, for technical effects that can be obtained by the communication apparatus, refer to the foregoing method embodiments. Details are not described herein again.

In embodiments of this disclosure, the terminal device may be divided into functional modules based on the foregoing method examples, for example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, division into the modules is an example, is merely logical function division, and may be other division in an actual implementation.

Figure 18:
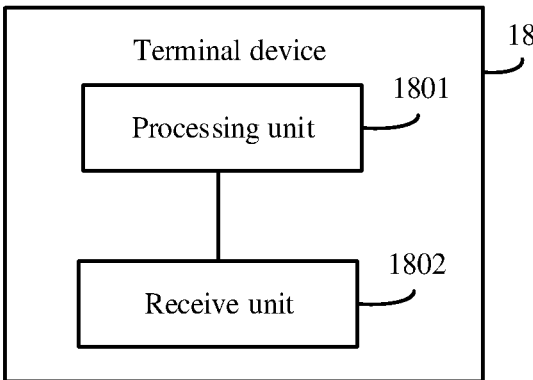
FIG. 18 is a schematic diagram of a structure of a terminal device according to an embodiment of this disclosure.

For example, when each functional module is obtained through division in an integrated manner, FIG. 18 is a schematic diagram of a structure of a communication apparatus. The communication apparatus may be a chip or a system-on-a-chip in the terminal device, or another combined component, another component, or the like that can implement a function of the terminal device. The communication apparatus may be configured to perform the function of the network device in the foregoing embodiments.

In a possible implementation, the communication apparatus shown in FIG. 18 includes a receive unit 1802 and a processing unit 1801. The receive unit 1802 is configured to receive a Wi-Fi frame transmitted by a first communication apparatus; and the processing unit 1801 is configured to: determine, based on a first preamble field in the Wi-Fi frame, a modulation and coding scheme MCS of at least one symbol in a data field in the Wi-Fi frame transmitted by the first communication apparatus, where an MCS order of first m symbols in the at least one symbol is less than an MCS order of another symbol, and m is a positive integer greater than or equal to 1; and demodulate the at least one symbol based on the MCS.

Optionally, the first preamble field includes a first high efficient-signal field HE-SIGA; and the first high efficient-signal field HE-SIGA includes the MCS order of the another symbol and a value for indicating that the MCS order of the first m symbols is lower than the MCS order of the another symbol.

Optionally, the first preamble field includes a first high efficient-signal field HE-SIGA; and the first high efficient-signal field HE-SIGA includes an MCS order of the at least one symbol.

Optionally, the first preamble field includes a first high efficient-signal field HE-SIGA; and the first high efficient-signal field HE-SIGA includes the MCS order of the another symbol; and the processing unit 1801 is specifically configured to: determine the MCS order of the another symbol based on the first high efficient-signal field HE-SIGA; and determine the MCS order of the first m symbols based on the MCS order of the another symbol.

Optionally, the first preamble field includes the first high efficient-signal field HE-SIGA; and the first high efficient-signal field HE-SIGA includes a bit for indicating a value of m.

Optionally, the first preamble field includes the first high efficient-signal field HE-SIGA; the first high efficient-signal field HE-SIGA includes a quantity of spatial streams of user data; and m=k*Nss, Nss is the quantity of the spatial streams, and k is a positive integer greater than or equal to 1.

Optionally, each of the first m symbols carries one spatial stream of the user data.

In a possible implementation, the first preamble field includes a high efficient-long training field HE-LTF; and m=S, and S is a quantity of symbols of the HE-LTF.

In a possible implementation, each of the first m symbols carries a plurality of spatial streams of user data; a plurality of spatial streams of user data carried in the at least one symbol are weighted by using an orthogonal P matrix, and the orthogonal P matrix is an m*m orthogonal matrix.

In a possible implementation, a subcarrier spacing of the first m symbols is greater than a subcarrier spacing of the another symbol.

All related content of the operations in the foregoing method embodiments may be cited in function descriptions of the corresponding functional modules. Details are not described herein again.

In this embodiment, the communication apparatus is presented in a form of the functional modules obtained through division in the integrated manner. The module herein may be a specific ASIC, a circuit, a processor that executes one or more software or firmware programs, a memory, an integrated logic circuit, and/or another component that can provide the foregoing functions. In a simple embodiment, a person skilled in the art may figure out that the communication apparatus may be in a form of the terminal device shown in FIG. 6.

For example, the processor 201 in FIG. 6 may invoke the computer-executable instructions stored in the memory 202, to enable the communication apparatus to perform the communication method for the wireless fidelity (Wi-Fi) system in embodiments of this disclosure.

For example, functions/implementation processes of the receive unit 1802 and the processing unit 1801 in FIG. 18 may be implemented by the processor 201 in FIG. 6 by invoking the computer-executable instructions stored in the memory 202. Alternatively, the function/implementation process of the processing unit 1801 in FIG. 18 may be implemented by the processor 201 in FIG. 6 by invoking the computer-executable instructions stored in the memory 202, and the function/implementation process of the receive unit 1802 in FIG. 18 may be implemented by using the receiver in the transceiver 303 in FIG. 6.

Because the communication apparatus provided in this embodiment may execute the communication method for the wireless fidelity (Wi-Fi) system, for technical effects that can be obtained by the communication apparatus, refer to the foregoing method embodiments. Details are not described herein again.

Optionally, an embodiment of this disclosure further provides a communication apparatus (for example, the communication apparatus may be a chip or a chip system). The communication apparatus includes a processor and an interface, and the processor is configured to read instructions to perform the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the memory may alternatively not be in the communication apparatus. When the communication apparatus is a chip system, the communication apparatus may include a chip, or may include a chip and another discrete component. This is not specifically limited in this embodiment of this disclosure.

Specifically, when the second communication apparatus is a terminal device, and the first communication apparatus is a network device, the transmit unit 1702 may be a transmitter when transmitting information, the receive unit 1802 may be a receiver when receiving information, and the transceiver unit may be a transceiver. The transceiver, the transmitter, or the receiver may be a radio frequency circuit. When the first communication apparatus and the second communication apparatus include a storage unit, the storage unit is configured to store computer instructions, the processor is communicatively connected to the memory, and the processor executes the computer instructions stored in the memory, so that the first communication apparatus and the second communication apparatus are enabled to perform the method in the method embodiments. The processor may be a general-purpose central processing unit (CPU), a microprocessor, or an application-specific integrated circuit (ASIC).

When the first communication apparatus and the second communication apparatus are chips, the transmit unit 1702 and the receive unit 1802 may be an input interface and/or an output interface, a pin, a circuit, or the like. The processing unit 1701 and the processing unit 1801 may execute computer-executable instructions stored in the storage unit, so that chips in the first communication apparatus and the second communication apparatus perform the method in the method embodiments. Optionally, the storage unit is a storage unit in the chip, for example, a register or a cache. Alternatively, the storage unit may be a storage unit that is in the terminal device or the network device and that is located outside the chip, for example, a read-only memory (ROM) or another type of static storage device that can store static information and instructions, or a random access memory (RAM).

All or some of the foregoing embodiments may be implemented by using software, hardware, firmware, or any combination thereof. When a software program is used to implement embodiments, all or some embodiments may be implemented in a form of a computer program product. The computer program product includes one or more computer instructions. When the computer program instructions are loaded and executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In embodiments of this disclosure, the computer may include the apparatus described above.

Although this disclosure is described with reference to embodiments, in a process of implementing this disclosure that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce better effect.

Although this disclosure is described with reference to specific features and embodiments thereof, it is clear that various modifications and combinations may be made to them without departing from the spirit and scope of this disclosure. Correspondingly, the specification and accompanying drawings are merely example description of this disclosure defined by the appended claims, and are considered as any of or all modifications, variations, combinations or equivalents that cover the scope of this disclosure. It is clearly that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A communication method for a wireless fidelity (Wi-Fi) system, the communication method comprising:
   generating a Wi-Fi frame comprising a preamble field and a data field including a plurality of orthogonal frequency division multiplexing (OFDM) symbols, wherein the preamble field indicates a modulation and coding scheme (MCS) of at least one symbol of the plurality of OFDM symbols in the data field in the Wi-Fi frame, a MCS order of first m symbol(s) at a beginning of the data field including the plurality of OFDM symbols is less than a MCS order of another symbol in the data field including the plurality of OFDM symbols after the first m symbol(s), and m is a positive integer greater than or equal to 1; and
   transmitting the Wi-Fi frame.

2. The communication method for the wireless fidelity (Wi-Fi) system according to claim 1, wherein the preamble field comprises a high efficient-signal field A (HE-SIGA); and the method further comprises:

determining a value by which the MCS order of the first m symbol(s) is lower than the MCS order of the another symbol; and including the value and the MCS order of the another symbol in the high efficient-signal field A (HE-SIGA).

3. The communication method for the wireless fidelity (Wi-Fi) system according to claim 1, wherein the preamble field comprises a high efficient-signal field A (HE-SIGA); and the method further comprises:

including a MCS order of the at least one symbol in the high efficient-signal field A (HE-SIGA).

4. The communication method for the wireless fidelity (Wi-Fi) system according to claim 1, wherein the preamble field comprises a high efficient-signal field A (HE-SIGA); and the method further comprises:

including the MCS order of the another symbol in the high efficient-signal field A (HE-SIGA).

5. The communication method for the wireless fidelity (Wi-Fi) system according to claim 1, and wherein the preamble field comprises a high efficient-signal field A (HE-SIGA); and the method further comprises:

including, in the high efficient-signal field A (HE-SIGA), a bit for indicating a value of m.

6. The communication method for the wireless fidelity (Wi-Fi) system according to claim 1, wherein the preamble field comprises a high efficient-signal field A (HE-SIGA); the high efficient-signal field A (HE-SIGA) comprises a quantity of spatial streams of user data; and m=k*Nss, Nss is the quantity of the spatial streams, and k is a positive integer greater than or equal to 1.

7. The communication method for the wireless fidelity (Wi-Fi) system according to claim 6, wherein each of the first m symbol(s) carries one spatial stream of the user data.

8. The communication method for the wireless fidelity (Wi-Fi) system according to claim 1, wherein the preamble field further comprises a high efficient-long training field (HE-LTF); and m=S, and S is a quantity of symbol(s) of the HE-LTF.

9. The communication method for the wireless fidelity (Wi-Fi) system according to claim 8, wherein each of the first m symbol(s) carries a plurality of spatial streams of user data; a plurality of spatial streams of user data carried in the at least one symbol are weighted by using an orthogonal P matrix, and the orthogonal P matrix is an m*m orthogonal matrix.

10. The communication method for the wireless fidelity (Wi-Fi) system according to claim 1, wherein a subcarrier spacing of the first m symbol(s) is greater than a subcarrier spacing of the another symbol.

11. A communication method for a wireless fidelity (Wi-Fi) system, the communication method comprising:

receiving a Wi-Fi frame transmitted by a communication apparatus, the Wi-Fi frame including a preamble field and a data field including a plurality of orthogonal frequency division multiplexing (OFDM) symbols;

determining, based on the preamble field in the Wi-Fi frame, a modulation and coding scheme (MCS) of at least one symbol of the plurality of OFDM symbols in the data field in the Wi-Fi frame transmitted by the communication apparatus, wherein a MCS order of first m symbol(s) at a beginning of the data field including the plurality of OFDM symbols is less than a MCS order of another symbol in the data field including the plurality of symbols after the first m symbol(s), and m is a positive integer greater than or equal to 1; and demodulating the at least one symbol based on the MCS.

12. The communication method for the wireless fidelity (Wi-Fi) system according to claim 11, wherein the preamble field comprises a high efficient-signal field A (HE-SIGA); and the high efficient-signal field A (HE-SIGA) comprises the MCS order of the another symbol and a value for indicating that the MCS order of the first m symbol(s) is lower than the MCS order of the another symbol.

13. The communication method for the wireless fidelity (Wi-Fi) system according to claim 11, wherein the preamble field comprises a high efficient-signal field A (HE-SIGA); and the high efficient-signal field A (HE-SIGA) comprises a MCS order of the at least one symbol.

14. The communication method for the wireless fidelity (Wi-Fi) system according to claim 11, wherein the preamble field comprises a high efficient-signal field A (HE-SIGA); and the high efficient-signal field A (HE-SIGA) comprises the MCS order of the another symbol; and the determining, based on the preamble field in the Wi-Fi frame, the modulation and coding scheme (MCS) of at least one symbol in the data field in the Wi-Fi frame transmitted by the communication apparatus comprises:

determining the MCS order of the another symbol based on the high efficient-signal field A (HE-SIGA); and determining the MCS order of the first m symbol(s) based on the MCS order of the another symbol.

15. The communication method for the wireless fidelity (Wi-Fi) system according to claim 11, wherein the preamble field comprises a high efficient-signal field A (HE-SIGA); and the high efficient-signal field A (HE-SIGA) comprises a bit for indicating a value of m.

16. The communication method for the wireless fidelity (Wi-Fi) system according to claim 11, wherein the preamble field comprises a high efficient-signal field A (HE-SIGA); the high efficient-signal field A (HE-SIGA) comprises a quantity of spatial streams of user data; and m=k*Nss, Nss is the quantity of the spatial streams, and k is a positive integer greater than or equal to 1.

17. The communication method for the wireless fidelity (Wi-Fi) system according to claim 16, wherein each of the first m symbol(s) carries one spatial stream of the user data.

18. The communication method for the wireless fidelity (Wi-Fi) system according to claim 11, wherein the preamble field comprises a high efficient-long training field (HE-LTF); and m=S, and S is a quantity of symbol(s) of the HE-LTF.

19. The communication method for the wireless fidelity (Wi-Fi) system according to claim 18, wherein each of the first m symbol(s) carries a plurality of spatial streams of user data; a plurality of spatial streams of user data carried in the at least one symbol are weighted by using an orthogonal P matrix, and the orthogonal P matrix is an m*m orthogonal matrix.

20. A communication apparatus comprising:

a processor, configured to generate a (Wi-Fi) frame comprising a preamble field and a data field including a plurality of orthogonal frequency division multiplexing (OFDM) symbols, wherein the preamble field indicates a modulation and coding scheme (MCS) of at least one symbol of the plurality of OFDM symbols in the data field in the Wi-Fi frame, a MCS order of first m symbol(s) at a beginning of the data field including the plurality of OFDM symbols is less than a MCS order of another symbol in the data field including the plurality of OFDM symbols after the first m symbol(s), and m is
a positive integer greater than or equal to 1; and
a transmitter, configured to transmit the Wi-Fi frame.

* * * * *